United States Patent
Zhou et al.

(10) Patent No.: US 9,585,159 B2
(45) Date of Patent: Feb. 28, 2017

(54) OPPORTUNISTIC DUAL-BAND RELAY

(71) Applicant: QUALCOMM Incorporated, San Diego, CA (US)

(72) Inventors: Yan Zhou, San Diego, CA (US); George Cherian, San Diego, CA (US); Simone Merlin, Solana Beach, CA (US)

(73) Assignee: QUALCOMM Incorporated, San Diego, CA (US)

(*) Notice: Subject to any disclaimer, the term of this patent is extended or adjusted under 35 U.S.C. 154(b) by 235 days.

(21) Appl. No.: 14/576,829

(22) Filed: Dec. 19, 2014

(65) Prior Publication Data

US 2016/0183271 A1  Jun. 23, 2016

(51) Int. Cl.

| | |
|---|---|
| *H04W 72/08* | (2009.01) |
| *H04B 17/309* | (2015.01) |
| *H04W 24/02* | (2009.01) |
| *H04W 40/22* | (2009.01) |
| *H04B 7/26* | (2006.01) |
| *H04W 84/12* | (2009.01) |
| *H04W 88/04* | (2009.01) |

(52) U.S. Cl.
CPC ........ *H04W 72/085* (2013.01); *H04B 7/2606* (2013.01); *H04B 17/309* (2015.01); *H04W 24/02* (2013.01); *H04W 40/22* (2013.01); *H04W 84/12* (2013.01); *H04W 88/04* (2013.01)

(58) Field of Classification Search
None
See application file for complete search history.

(56) References Cited

U.S. PATENT DOCUMENTS

| 7,720,020 B2* | 5/2010 | Larsson | H04B 7/022 370/315 |
|---|---|---|---|
| 2006/0252367 A1* | 11/2006 | Haartsen | H04B 7/2606 455/11.1 |
| 2007/0155338 A1* | 7/2007 | Hong | H04B 7/026 455/69 |
| 2008/0056177 A1* | 3/2008 | Mori | H04W 52/04 370/318 |
| 2008/0056199 A1* | 3/2008 | Park | H04W 40/22 370/332 |
| 2008/0227388 A1* | 9/2008 | Popovski | H04B 7/2603 455/17 |

(Continued)

OTHER PUBLICATIONS

International Search Report and Written Opinion—PCT/US2015/061975—ISA/EPO—Feb. 17, 2016.

*Primary Examiner* — Gary Mui
(74) *Attorney, Agent, or Firm* — Paradice and Li LLP

(57) ABSTRACT

A method of enabling data to be relayed between an access point (AP) and a target station (STA). The AP identifies the target STA based at least in part on a medium usage efficiency of the target STA. The AP further sends a relay selection trigger to the target STA to cause the target STA to broadcast a relay selection request to a set of candidate STAs. The relay selection request includes a set of metrics pertaining to a direct link between the AP and the target STA. The AP then receives one or more relay selection responses from one or more candidate STAs in the set of candidate STAs based at least in part on the set of metrics and selects a relay STA from the set of candidate STAs based at least in part on the one or more relay selection responses.

30 Claims, 14 Drawing Sheets

(56) References Cited

U.S. PATENT DOCUMENTS

| | | | |
|---|---|---|---|
| 2008/0288580 A1* | 11/2008 | Wang | H04L 29/12509 709/203 |
| 2009/0061767 A1* | 3/2009 | Horiuchi | H04B 7/155 455/18 |
| 2009/0290528 A1* | 11/2009 | Kwon | H04B 7/155 370/315 |
| 2010/0128622 A1* | 5/2010 | Horiuchi | H04B 7/155 370/252 |
| 2010/0167743 A1 | 7/2010 | Palanki et al. | |
| 2010/0302992 A1* | 12/2010 | Zhuang | H04W 40/04 370/313 |
| 2011/0134827 A1* | 6/2011 | Hooli | H04W 72/04 370/315 |
| 2012/0087300 A1 | 4/2012 | Seok | |
| 2013/0188552 A1 | 7/2013 | Kazmi et al. | |
| 2013/0223324 A1* | 8/2013 | Somasundaram | H04W 16/26 370/315 |
| 2013/0336196 A1 | 12/2013 | Abraham et al. | |
| 2014/0036893 A1* | 2/2014 | Bhanage | H04L 69/16 370/338 |
| 2014/0066119 A1 | 3/2014 | Tavildar et al. | |
| 2014/0254471 A1 | 9/2014 | Fang et al. | |
| 2014/0329535 A1 | 11/2014 | Sadiq et al. | |
| 2015/0045033 A1* | 2/2015 | Kim | H04B 7/15507 455/436 |

\* cited by examiner

OPPORTUNISTIC DUAL-BAND RELAY

TECHNICAL FIELD

The present embodiments relate generally to wireless networks, and specifically to improving throughput of communications between devices in the network.

BACKGROUND OF RELATED ART

A wireless local area network (WLAN) may be formed by one or more access points (APs) that provide a wireless communication channel or link with a number of client devices or stations (STAs). Each AP, which may correspond to a Basic Service Set (BSS), periodically broadcasts beacon frames to enable any STAs within wireless range of the AP to establish and/or maintain a communication link with the WLAN. Once a connection is established, the STA and the AP may exchange data (e.g., using one or more protocols defined by the IEEE 802.11 standards).

An AP may serve multiple STAs in a wireless network. However, communications with STAs at the edge of the network (e.g., furthest from the AP) may be inefficient due to poor link quality and/or interference in the medium. For example, medium usage (MU) efficiency may be characterized by the highest achievable modulation and coding scheme (MCS) with a packet error rate (PER) of less than 10%. More specifically, the MU efficiency for a STA at the edge of the network (e.g., the "edge STA") may be substantially lower than the MU efficiency for a STA closer to the AP. Such medium inefficiency may lead to lower throughput at the edge STA. In other words, for a given medium usage (e.g., percentage of time the AP spends transmitting data), the throughput for the edge STA will be less than the throughput for a STA closer to the AP.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method of enabling data to be relayed between a computing device and a target station (STA) is disclosed. The computing device identifies the target STA based at least in part on a medium usage efficiency of the target STA. The computing device further sends a relay selection trigger to the target STA to cause the target STA to broadcast a relay selection request to a set of candidate STAs. The relay selection request includes a set of metrics pertaining to a direct link between the computing device and the target STA. The computing device then receives one or more relay selection responses from the set of candidate STAs based at least in part on the set of metrics, and selects a relay STA from the set of candidate STAs based at least in part on the one or more relay selection responses.

The computing device may identify the target STA as the STA with the lowest medium usage efficiency among a plurality of STAs in the network. For some embodiments, the set of metrics may comprise at least one of a throughput of the direct link or a received signal strength indicator (RSSI) value associated with the computing device, as measured by the target STA. In other embodiments, the set of metrics may further comprise at least one of a modulation and coding scheme (MCS) supported by the direct link, a goodput of the direct link, or a medium usage by the target STA in the direct link.

The relay selection request may cause each candidate STA in the set of candidate STAs to selectively transmit a respective one of the one or more relay selection responses based at least in part on whether the candidate STA is able to improve upon the throughput of the direct link by relaying data between the computing device and the target STA. More specifically, the relay selection request may cause each candidate STA to determine an estimated throughput of a first relay link between the candidate STA and the computing device, and to determine an estimated throughput of a second relay link between the candidate STA and the target STA. For some embodiments, a channel or frequency of the second relay link may be different than a channel or frequency of the first relay link. Each candidate STA may then transmit the respective relay selection response if the estimated throughput of the first relay link is an improvement over the throughput of the direct link by at least a first threshold gain and the estimated throughput of the second relay link is an improvement over the throughput of the direct link by at least a second threshold gain.

For some embodiments, the respective relay selection response may include the estimated throughput of the first relay link and the estimated throughput of the second relay link. In other embodiments, the respective relay selection response may further include at least one of a channel or frequency of the second relay link, an MCS supported by the first relay link, a goodput of the first relay link, or an RSSI value associated with the computing device, as measured by the candidate STA. The computing device may select the relay STA by first determining a combined throughput gain associated with each of the one or more relay selection responses based at least in part on the estimated throughput of the first relay link and the estimated throughput of the second relay link included with each relay selection response. The computing device may then select the candidate STA associated with the highest combined throughput gain to be the relay STA.

By allowing the computing device (e.g., AP) to select both the target STA and the relay STA, the method of operation disclosed herein may significantly improve the overall load of the network. More specifically, the AP may be best suited to identify the target STA with the least efficient medium usage as well as the particular relay STA that optimizes throughput for the target STA. Furthermore, the embodiments herein may utilize multiple transceivers on the target STA (and/or the relay STA) to enable simultaneous (in-band) communications with the AP and (out-band) communications with the relay STA (and/or target STA).

BRIEF DESCRIPTION OF THE DRAWINGS

The example embodiments are illustrated by way of example and are not intended to be limited by the figures of the accompanying drawings, where.

DETAILED DESCRIPTION

The present embodiments are described below in the context of data exchanges between Wi-Fi enabled devices for simplicity only. It is to be understood that the present embodiments may be equally applicable to data exchanges using signals of other various wireless standards or protocols. As used herein, the terms "WLAN" and "Wi-Fi" can include communications governed by the IEEE 802.11 family of standards, BLUETOOTH® (Bluetooth), HiperLAN (a set of wireless standards, comparable to IEEE 802.11 standards, used primarily in Europe), and other technologies having relatively short radio propagation range. In addition, although described herein in terms of exchanging frames between wireless devices, the present embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). As used herein, the term "in-band" refers to a channel and/or frequency on which an access point operates (e.g., broadcasts beacons and/or communicates with client stations). Further, the terms "in-band channel" and "in-band link" may be used herein interchangeably. Similarly, the term "out-band" refers to any channel and/or frequency other than that on which the access point operates. Further, the terms "out-band channel" and "out-band link" may also be used herein interchangeably.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The present embodiments are not to be construed as limited to specific examples described herein but rather to include within their scope all embodiments defined by the appended claims.

Figure 1:
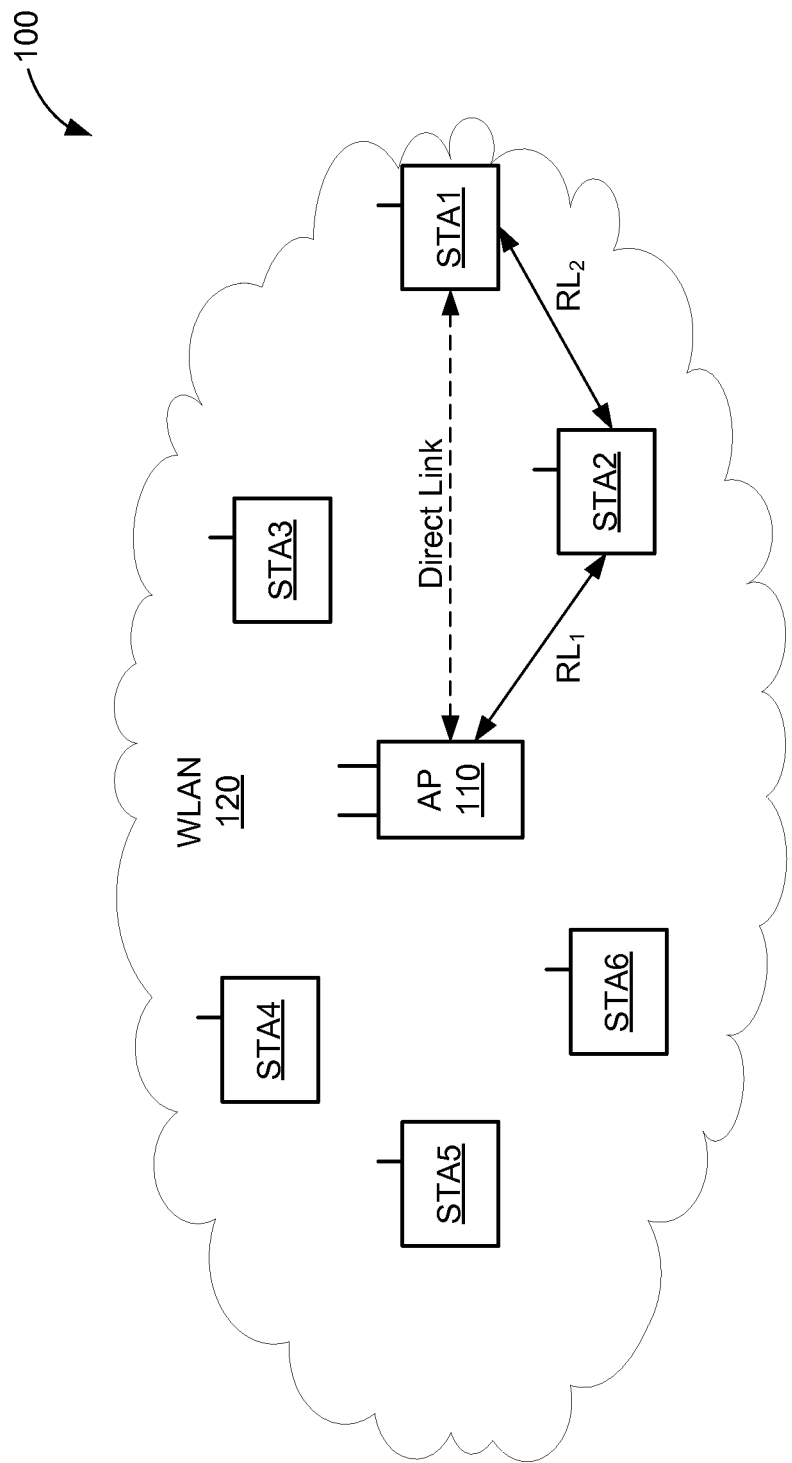
FIG. 1 shows a block diagram of a WLAN system within which the example embodiments may be implemented.

FIG. 1 shows a block diagram of a WLAN system within which the present embodiments may be implemented. The system is shown to include a number of wireless stations STA1-STA6, a wireless access point (AP) 110, and a wireless local area network (WLAN) 120. The WLAN 120 may "reside" on a particular wireless channel (e.g., the "in-band" channel) of a corresponding frequency band (e.g., the 2.4 GHz band or 5 GHz band), and may be identified by a network name commonly referred to as its SSID. More specifically, wireless devices may identify and connect to the WLAN 120 (and more specifically to the AP 110) based on the service set identifier (SSID), and may subsequently communicate with other devices on the network (e.g., while connected to the WLAN 120) via the in-band channel.

The wireless stations STA1-STA6 may be any suitable Wi-Fi enabled wireless devices including, for example, cell phones, personal digital assistants (PDAs), tablet devices, laptop computers, or the like. For at least some embodiments, the stations STA1-STA6 may include at least one transceiver, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 7, 10, and 11.

The AP 110 may be any suitable device that allows one or more wireless devices to connect to a network (e.g., a LAN, WAN, MAN, and/or the Internet) via AP 110 using Wi-Fi, Bluetooth, ZigBee, WiGig, or any other suitable wireless communication protocols. For at least one embodiment, AP 110 may include at least one transceiver, a network interface, one or more processing resources, and one or more memory resources. The memory resources may include a non-transitory computer-readable medium (e.g., one or more nonvolatile memory elements, such as EPROM, EEPROM, Flash memory, a hard drive, etc.) that store instructions for performing operations described below with respect to FIGS. 6 and 7.

The AP 110 may periodically broadcast beacon frames to enable any STAs within wireless range to establish and/or maintain a communication link with the WLAN 120. More specifically, the AP 110 may broadcast beacon frames at regular "beacon intervals" based on a Target Beacon Transmission Time (TBTT) schedule. A STA may also initiate a connection to the AP 110 by sending a probe request to the AP 110, which responds with a probe response. The beacon frame and probe response may include information (e.g., SSID, supported data rates, capabilities, etc.) used for associating the STA with AP 110. Once connected to the WLAN 120, the STA may communicate directly with the AP 110 (e.g., via a direct link) on the in-band channel. For some embodiments, the AP 110 may detect a "poor quality" direct link with any one of the STAs connected to the WLAN 120. More specifically, the AP 110 may determine the quality of a direct link with a particular STA based on a medium usage efficiency attributable to the STA at the other end of the link. Medium usage (MU) may be defined as the percentage of time the AP 110 spends transmitting data to a particular STA relative to the total time spent transmitting data to all of the STAs in the network. Thus, a STA may have a "low" MU efficiency if the MU for that STA exceeds an MU threshold. For a given MU, low MU efficiency may lead to degradation in throughput at the corresponding STA. Thus, upon detecting a STA with poor link quality (e.g., designed as a "target STA"), the AP 110 may configure and/or enable another STA (e.g., designated as a "relay STA") on the WLAN 120 to relay data between the AP 110 and the target STA.

For example, the AP 110 may detect that STA1 has a low MU efficiency due to its location at the edge of the WLAN 120 (e.g., furthest from the AP 110). The AP 110 may further identify STA2 as a potential relay STA that can be used to improve communications between the AP 110 and STA1. More specifically, the overall throughput of communications across a first relay link ($RL_1$), between the AP 110 and STA2, and a second relay link ($RL_2$), between STA2 and STA1, may be greater than the throughput of the direct link between AP 110 and STA1. For some embodiments, the first relay link $RL_1$ may coincide with an in-band channel and the second relay link $RL_2$ may coincide with an out-band channel (e.g., so that the relaying of data between STA1 and STA2 does not interfere with other communications on the WLAN 120). Accordingly, the AP 110 may improve communications (e.g., and thus throughput) with STA1 by enabling STA2 to act as a relay device and subsequently routing data exchanges with STA1 through STA2.

Figure 2:
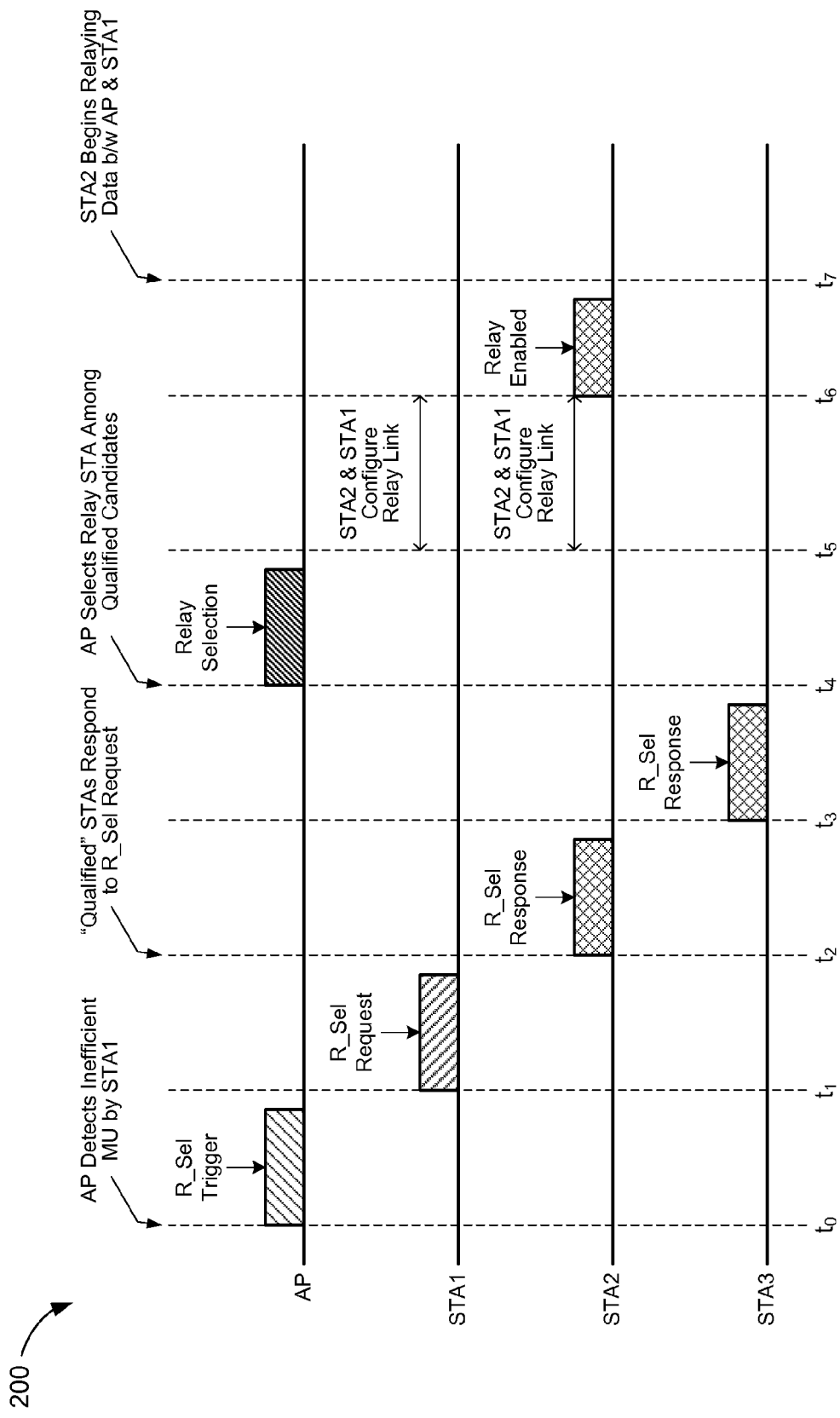
FIG. 2 is an exemplary timing diagram illustrating an opportunistic relay selection operation, in accordance with some embodiments.

FIG. 2 is an exemplary timing diagram illustrating an opportunistic relay selection operation 200, in accordance with some embodiments. With reference, for example, to FIG. 1, the AP 110 may initiate the relay selection process 200 (e.g., at time $t_0$) upon detecting that the total network load (e.g., of WLAN 120) exceeds a threshold level. The AP 110 may then identify a STA (e.g., the target STA) on the WLAN 120 with low MU efficiency. As described above, a STA may have a "low" MU efficiency if the MU for that STA exceeds a threshold percentage. Alternatively, and/or in addition, MU efficiency may be characterized by the highest achievable modulation and coding scheme (MCS) that can be used for communications between the AP 110 and a corresponding STA while maintaining at least a threshold PER (e.g., of less than 10%). Thus, a STA may have a "low" MU efficiency if the highest achievable MCS for that STA is below a threshold MCS. Still further, a STA may have a "low" MU efficiency if the maximum goodput (e.g., defined as: MCS*(1−PER)) of a direct link between the AP 110 and the STA, across all MCSs, is below a threshold maximum goodput. For some embodiments, the AP 110 may identify the target STA as the STA with the lowest MU efficiency among the plurality of the STAs (e.g., STA1-STA6) in the network (e.g., WLAN 120). Thus, upon identifying a target STA, the AP 110 may detect an opportunity to reduce the network load and/or improve the throughput of communications with the target STA by routing communications to and from the target STA through another STA acting as a relay device.

At time $t_0$, the AP 110 identifies STA1 as having a low (or the lowest) MU efficiency among the plurality of STAs (e.g., STA1-STA6) on the WLAN 120, and may designate STA1 as the target STA. The AP 110 may thus transmit a relay selection (R_Sel) trigger frame to STA1 (e.g., at time $t_0$) to begin the relay selection process 200. The R_Sel trigger may include information (e.g., one or more metrics) about the direct link between the AP 110 and target STA (e.g., STA1). For example, the information may include the highest achievable MCS (e.g., within a threshold PER) in the direct link, the maximum goodput of the direct link, and/or the MU attributable to the target STA. As described in greater detail below, this information may be used to prevent "unqualified" STAs from participating in the relay selection process. For some embodiments, the R_Sel trigger information may be sent in a new action frame (e.g., as a vendor-specific information element).

The R_Sel trigger frame causes STA1 to send (e.g., broadcast) an R_Sel request frame to one or more other STAs in the network at time $t_1$. More specifically, the R_Sel request frame may be used to solicit other STAs (e.g., "candidate STAs") on the WLAN 120 that can potentially serve as relay devices between the AP 110 and STA1. The R_Sel request frame may include information (e.g., one or more metrics) about the direct link between the AP 110 and STA1. For example, the R_Sel request frame may contain information from the R_Sel trigger frame sent by the AP 110 to STA1, including: the highest achievable MCS (e.g., within a threshold PER) in the direct link, the maximum goodput of the direct link, and/or the MU attributable to the target STA.

For some embodiments, the R_Sel request frame may contain additional information about the direct link as measured by STA1. The additional information may include a received signal strength indication (RSSI) value for the AP 110 as measured by STA1 and/or the throughput of the direct link as measured by STA1. For example, a candidate STA may estimate the throughput of the direct link (DL) using the following equation:

$$\text{Thrp}[DL]=MCS_D*(1-PER)*MU_D \tag{1}$$

where $MCS_D$ is the MCS that maximizes goodput (e.g., max[MCS*(1−PER)]) or is the highest achievable MCS in the direct link while maintaining at least a threshold PER (e.g., of less than 10%), and $MU_D$ represents the percentage of the AP's medium usage that is attributable to the target STA.

For some embodiments, the R_Sel request frame may also include information about the medium load of each candidate out-band channel (e.g., to be used for a second relay link) as measured by STA1. As described in greater detail below, this information may be used by the candidate STAs to select an out-band channel with which to establish a relay link with STA1.

A set of candidate STAs receive the R_Sel request frame and determine whether they are qualified to act as a relay between the AP 110 and STA1 (e.g., at time $t_2$). The set of candidate STAs may include any STAs (e.g., STA2-STA6) on the WLAN 120 that are in the vicinity of STA1 and/or able to receive the R_Sel request frame. For some embodiments, the AP 110 may incentivize qualified STAs to respond to the R_Sel request frame by allocating additional resources (e.g., such as longer transmit opportunities, more frequent transmit opportunities, and/or space resources) and/or access opportunities (e.g., such as more aggressive Enhanced Distributed Channel Access (EDCA) settings and/or guaranteed Quality of Service (QoS)) to the relay STA. For example, the AP 110 may broadcast the EDCA settings, minimum resource allocations, and/or minimum guaranteed QoS (e.g., throughput or average packet latency) for the relay STA in beacon and/or probe response frames.

In some instances, one or more STAs on the network may be unable to receive the R_Sel request frame even though they are within communications range of STA1. For example, a potential candidate STA may be in a low-power (e.g., "sleep") mode and/or may filter out frames that are not specifically addressed to that STA (e.g., such as broadcast frames). Thus, for some embodiments, the AP 110 may help ensure that potential candidate STAs are able to receive the R_Sel request frame from STA1. For example, the AP 110 may first assert a message indicator in the beacon frame broadcast to all STAs (e.g., to STA1-STA6) on the WLAN 120. The message indicator may instruct the STAs to remain awake and listen for additional messages from the AP 110.

The AP 110 may then broadcast and/or multicast the R_Sel trigger frame (e.g., at time $t_0$) to the target STA (e.g., STA1) and any candidate STAs (e.g., STA2-STA6). More specifically, the R_Sel trigger frame may instruct the candidate STAs to remain awake and listen for an R_Sel request frame from STA1. Alternatively, and/or in addition, the AP 110 may broadcast a separate "keep awake" frame to the candidate STAs (e.g., before or after sending the R_Sel trigger frame to STA1) instructing the candidate STAs to remain awake and listen for an R_Sel request frame from STA1.

Upon receiving the R_Sel request frame, each candidate STA analyzes the information included in the R_Sel request frame to determine whether that STA is qualified to act as a relay between the AP 110 and STA1. For example, a candidate STA may be "qualified" if, while acting as a relay: (1) there would be sufficient throughput gain in a first relay link between the AP 110 and the candidate STA (e.g., a throughput of the first relay link is greater than a throughput of the direct link by a threshold amount); (2) there would be sufficient throughput gain in a second relay link between the candidate STA and STA1 (e.g., a throughput of the second relay link is greater than a throughput of the direct link by a threshold amount); and (3) the candidate STA has sufficient battery life (e.g., there is enough charge stored on the battery for the candidate STA to remain operable for a threshold amount of time). For example, a candidate STA may obtain the throughput of the direct link (DL) from the received R_Sel request frame.

The candidate STA may further estimate the throughput of the first relay link ($RL_1$) as:

$$\text{Thrp}[RL_1]=MCS_{R1}*(1-PER)*MU_{R1} \qquad (2)$$

where $MCS_{R1}$ is the MCS that maximizes goodput (e.g., max[MCS*(1−PER)]) or is the highest achievable MCS in the first relay link that results in at least a threshold PER (e.g., of less than 10%), and $MU_{R1}$ represents the percentage of the AP's medium usage that would be attributable to the candidate STA (e.g., when acting as a relay). Furthermore, because the candidate STA would be assuming the medium usage of the target STA when acting as a relay, then the medium usage on the first relay link may be equivalent to the medium usage on the direct link (e.g., $MU_{R1}=MU_D$). For example, the medium usage on the direct link ($MU_D$) may be obtained from the R_Sel request frame.

Further, the candidate STA may determine whether the throughput gain in the first relay link is at least a threshold improvement over the throughput of the direct link. For example, the candidate STA may determine that there is sufficient throughput gain in the first relay link if the estimated throughput of the first relay link is at least M times greater than the estimated throughput of the direct link (e.g., $\text{Thrp}[RL_1]>M*\text{Thrp}[DL]$). As seen from the equations above (e.g., assuming $MU_{R1}=MU_D$), there may be sufficient throughput gain if the maximum goodput of the first relay link is at least M times greater than the maximum goodput of the direct link (e.g., $MCS_{R1}*(1-PER)>M*MCS_D*(1-PER)$). For at least some embodiments, the goodput of the first relay link may be determined based on an RSSI value measured by the candidate STA from beacon frames broadcast by the AP, and the goodput of the direct link may be obtained from the R_Sel request frame. There may also be sufficient throughput gain if the highest achievable MCS in the first relay link (e.g., within a threshold PER) is at least M times greater than the highest achievable MCS in the direct link (e.g., within a threshold PER). For at least some embodiments, the highest achievable MCS in the first relay link may be determined based on the RSSI value measured by the candidate STA, and the highest achievable MCS in the direct link may be obtained from the R_Sel request frame.

Still further, for some embodiments, a candidate STA may determine that there is sufficient throughput gain in the first relay link if the RSSI value of AP 110 measured by the candidate STA is at least a threshold amount greater than the RSSI value of AP 110 measured by the target STA (e.g., STA1). For example, the RSSI value of AP 110 measured by STA1, which may be indicative of the throughput of the direct link, may be embedded in the R_Sel request frame and subsequently obtained by the candidate STAs upon receiving the R_Sel request frame. More specifically, the RSSI value of AP 110 may be embedded in an information element of the R_Sel request frame. More specifically, there may be sufficient throughput gain if the RSSI value ($RSSI_C$) at the candidate STA is at least X times greater than the RSSI value ($RSSI_T$) at STA1 (e.g., $RSSI_C>X*RSSI_T$), where X is chosen so that the maximum goodput in the first relay link will be at least M times greater than the maximum goodput in the direct link.

The candidate STA may estimate the throughput of the second relay link ($RL_2$) as:

$$\text{Thrp}[RL_2]=MCS_{R2}*(1-PER)*MU_{R2} \qquad (3)$$

where $MCS_{R2}$ is the MCS that maximizes goodput (e.g., max[MCS*(1−PER)]) or is the highest achievable MCS in the second relay link that results in at least a threshold PER (e.g., of less than 10%), and $MU_{R2}$ is the maximum available medium usage across all candidate relay links (e.g., for $RL_2$). For some embodiments, $RL_2$ may be on a different channel and/or frequency than $RL_1$. Thus, to determine $MU_{R2}$, the candidate STA may first determine the available MU for each candidate relay (e.g., out-band and/or in-band) channel. For example, the available MU for a candidate relay channel may be calculated as the minimum of 1 minus the total load on that channel (e.g., provided as a fraction or a percentage of the maximum load capacity of the channel) as measured by the candidate STA and 1 minus the total load on that channel as measured by the target STA (e.g., which may be obtained from the R_Sel request frame). The candidate STA may then compare the available MU per candidate relay channel to determine the maximum available MU across all candidate relay channels (e.g., $MU_{R2}$).

Further, the candidate STA may determine whether the throughput gain in the second relay link is at least a threshold greater than the throughput of the direct link. For example, the candidate STA may determine that there is sufficient throughput gain in the second relay link if the estimated throughput of the second relay link is at least N times greater than the estimated throughput of the direct link (e.g., $\text{Thrp}[RL_2]>N*\text{Thrp}[DL]$). As described above, the throughput of the direct link may be obtained from the R_Sel request frame.

At time $t_2$, each qualified candidate STA sends an R_Sel response frame to the AP 110. As described above, a candidate STA may deem itself qualified to act as a relay if there is sufficient throughput gain in its first relay link (e.g., the link between the AP 110 and the candidate STA) and in its second relay link (e.g., the link between the candidate STA and the target STA), and the candidate STA has sufficient battery life to sustain a threshold period of operation. The qualified STAs (e.g., STA2 and STA3 in the example of FIG. 2) may send their respective R_Sel response frames at separate times, for example, using a carrier sense multiple access (CSMA) control mechanism or any other known channel access control mechanism. More specifically, STA2 sends its R_Sel response frame at time $t_2$, and STA3 sends its R_Sel response frame at time $t_3$. The remaining STAs on the WLAN 120 (e.g., STA4-STA6, for this example) may be unqualified to act as relays due to their location in the network. For example, the remaining STAs may be out of communications range with STA1 (e.g., and thus unable to receive the R_Sel request frame) or may be unable to improve upon the throughput in the direct link between AP 110 and STA1 (e.g., because they are further from STA1 than the AP 110).

Each R_Sel response frame may include information (e.g., one or more metrics) about a first relay link between the AP 110 and a corresponding qualified STA as well as information about a second relay link between the qualified STA and the target STA (e.g., STA1). For example, the information about the first relay link may include the RSSI value of the AP 110 as measured by the qualified STA, the highest achievable MCS at a threshold PER in the first relay link, the maximum goodput of the first relay link, and/or the estimated throughput of the first relay link. The information about the second relay link may include a channel and/or frequency band for the second relay link and/or the estimated throughput of the second relay link.

The AP 110 then selects one of the qualified STAs to act as a relay (e.g., at time $t_4$) based on the information provided within the R_Sel response frames. For some embodiments, the AP 110 may select the qualified STA that maximizes throughput for the target STA (e.g., STA1). For example, in a relay configuration, the overall throughput may be limited by the throughput in either the first relay link or the second relay link (e.g., whichever is smaller). Thus, the AP 110 may compare the lesser of the throughputs in the first relay link or the second relay link, for each qualified STA, and select the STA that yields the highest throughput when acting as a relay. For some embodiments, the relay STA selection may also depend on the channel and/or frequency of the second relay link associated with each qualified STA. For example, it may be desirable to select a relay STA that communicates with the target STA on an out-band channel (used to link the relay STA and the target STA) furthest from, and/or least likely to interfere with, the in-band channel (used to link the relay STA and the AP 110).

After selecting a relay STA, the AP 110 may send a relay selection frame, at time $t_4$, to the selected relay STA (e.g., STA2, for the example of FIG. 2) and/or the target STA (e.g., STA1). For example, the relay selection frame may be unicast to STA2 (e.g., and/or STA1) or multicast to both STA1 and STA2. For some embodiments, the relay selection frame may specify the channel and/or frequency (e.g., the out-band channel) to be used for the second relay link between the relay STA and the target STA. The relay selection frame may also include association and authentication information (e.g., to enable secure communications between the target STA and the relay STA). More specifically, the authentication information (e.g., an authentication key) may be used by both STA1 and STA2 to encrypt and/or decrypt messages transmitted over the second relay link.

At time $t_5$, the relay STA (e.g., STA2) and the target STA (e.g., STA1) establish the second relay link (e.g., $RL_2$) based at least in part on the information included in the relay selection frame. For example, STA1 and STA2 may establish the second relay link using known relay setup procedures (e.g., as defined by the IEEE 802.11 specification). Once the second relay link is established, at time $t_6$, STA2 (or STA1) sends a "relay enabled" message to the AP 110 to confirm that the relay STA is ready to begin relaying data between the AP 110 and the target STA (e.g., at time $t_7$).

For some embodiments, the relayed data may be encrypted (e.g., using an authentication key). For example, the AP 110 may send encrypted data, intended for the target STA (e.g., STA1), to the relay STA (e.g., STA2). The data may be encrypted using a first authentication key that is associated with the first relay link (e.g., the in-band channel). The relay STA may decrypt the data with the first authentication key and re-encrypt the data with a second authentication key prior to sending the data to the target STA. The second authentication key may be associated with the second relay link (e.g., the out-band channel), and may therefore be different than the first authentication key. Alternatively, the AP 110 may encrypt data intended for the target STA using an authentication key known only to the target STA (e.g., STA1). Accordingly, the relay STA (e.g., STA2) may forward the encrypted data directly to the target STA (e.g., without decrypting it first). Further, for some embodiments, additional layers of encryption and/or decryption may be added to the encrypted data for each of the first relay link (e.g., in-band channel) and/or second relay link (e.g., out-band channel).

If the relay setup is unsuccessful (e.g., at time $t_6$), at least one of the STAs may send a termination frame to the AP 110 to terminate the relay selection process 200. Alternatively, and/or additionally, the AP 110 may terminate the relay selection process 200 if it does not receive a response from either of the STAs after a given interval of time. For some embodiments, the AP 110 may terminate the relay links if one or more conditions are met. For example, due to the mobility of the STAs, the performance of the direct link and/or relay links may change over time. Thus, the AP 110 may continue monitoring the performance of the direct link (e.g., by receiving RSSI values measured by the target STA) even after a relay has been established. The AP 110 may then terminate the relay links (e.g., $RL_1$ and $RL_2$) if the performance of the direct link increases to or above a performance threshold (e.g., if the RSSI values of AP 110 as measured by the target STA increases by a threshold amount). The AP 110 may also terminate the relay links if the total load on the WLAN 120 drops below a threshold amount and/or if communications with the target STA idles (e.g., there is no activity to or from the target STA) for a threshold duration.

Still further, for some embodiments, the AP 110 may reinitiate the relay selection process 200 if one or more conditions are met. As described above, the performance of the direct link and/or relay links may change over time. Thus, the AP 110 may monitor the performance of the relay links (e.g., $RL_1$ and $RL_2$), for example, by periodically receiving RSSI values measured by the target STA and the relay STA. The AP 110 may select a new relay STA if the performance of either of the relay links drops below a performance threshold (e.g., if either of the RSSI values decreases by a threshold amount and/or the throughput of at least one of the relay links is lower than the throughput of the direct link). The AP 110 may also reinitiate the relay selection process 200 if the available MU on the second relay link (e.g., the out-band channel) drops by a threshold percentage. For example, the AP 110 may periodically receive messages from each of the STAs indicating the available MU as measured by that STA. If the out-band channel becomes overloaded, it may be more efficient for the AP 110 to reinitiate the relay selection process 200 (e.g., to select a new relay STA and/or out-band channel) than to continue relaying data to the target STA over the current out-band channel.

Figure 3A:
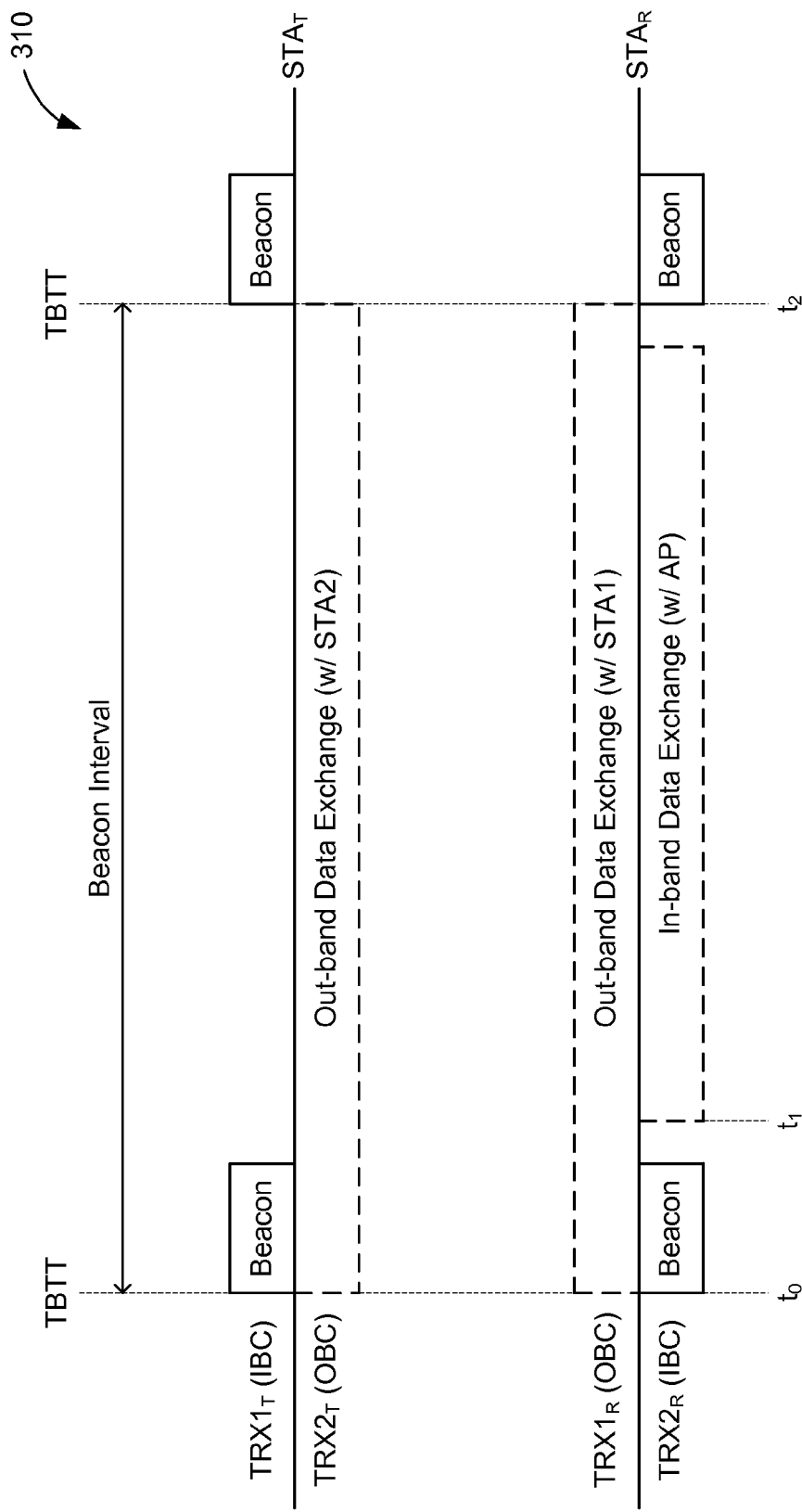
FIGS. 3A-3D are exemplary timing diagrams illustrating various relay link configurations, in accordance with some embodiments.
Figure 3B:
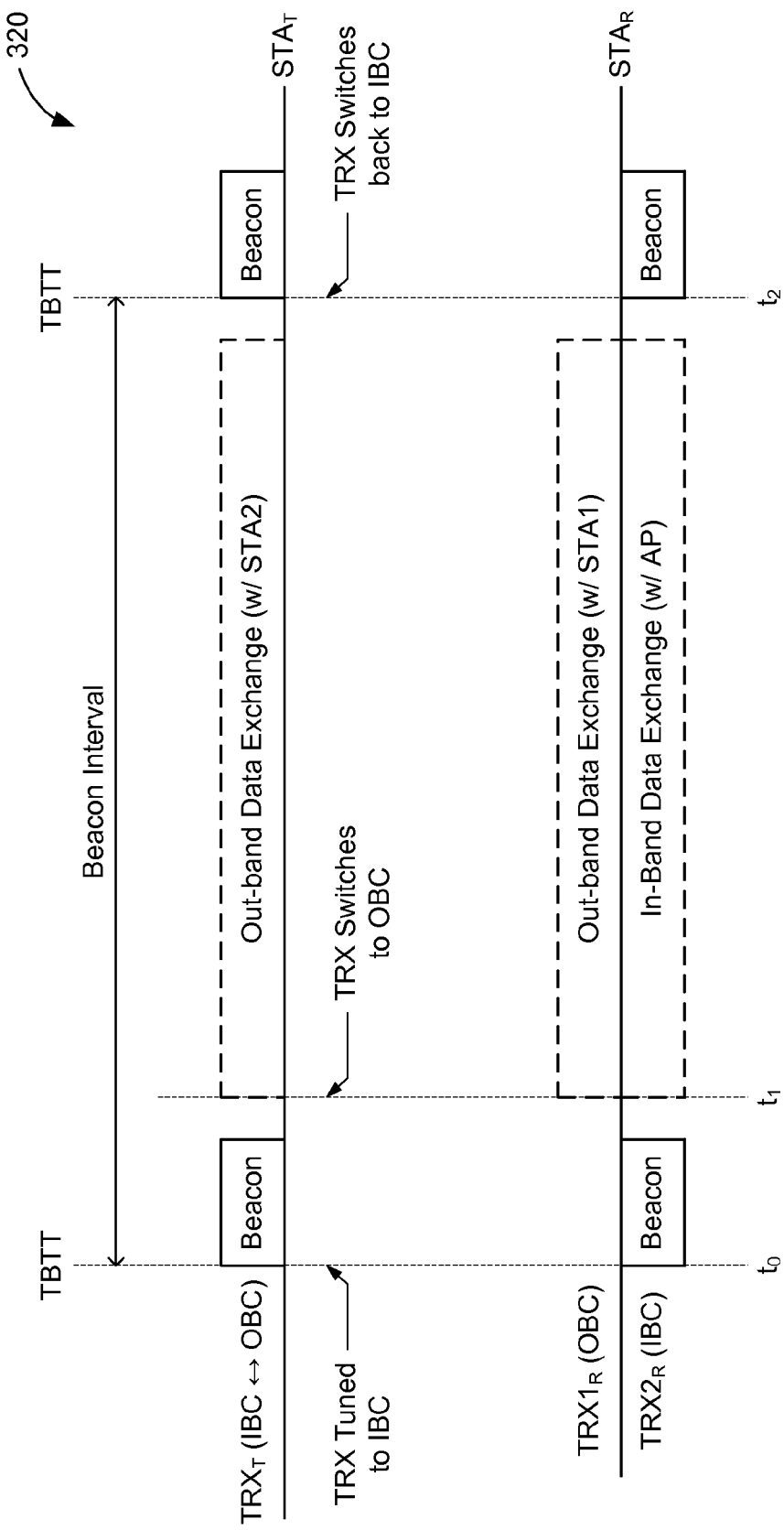
Figure 3C:
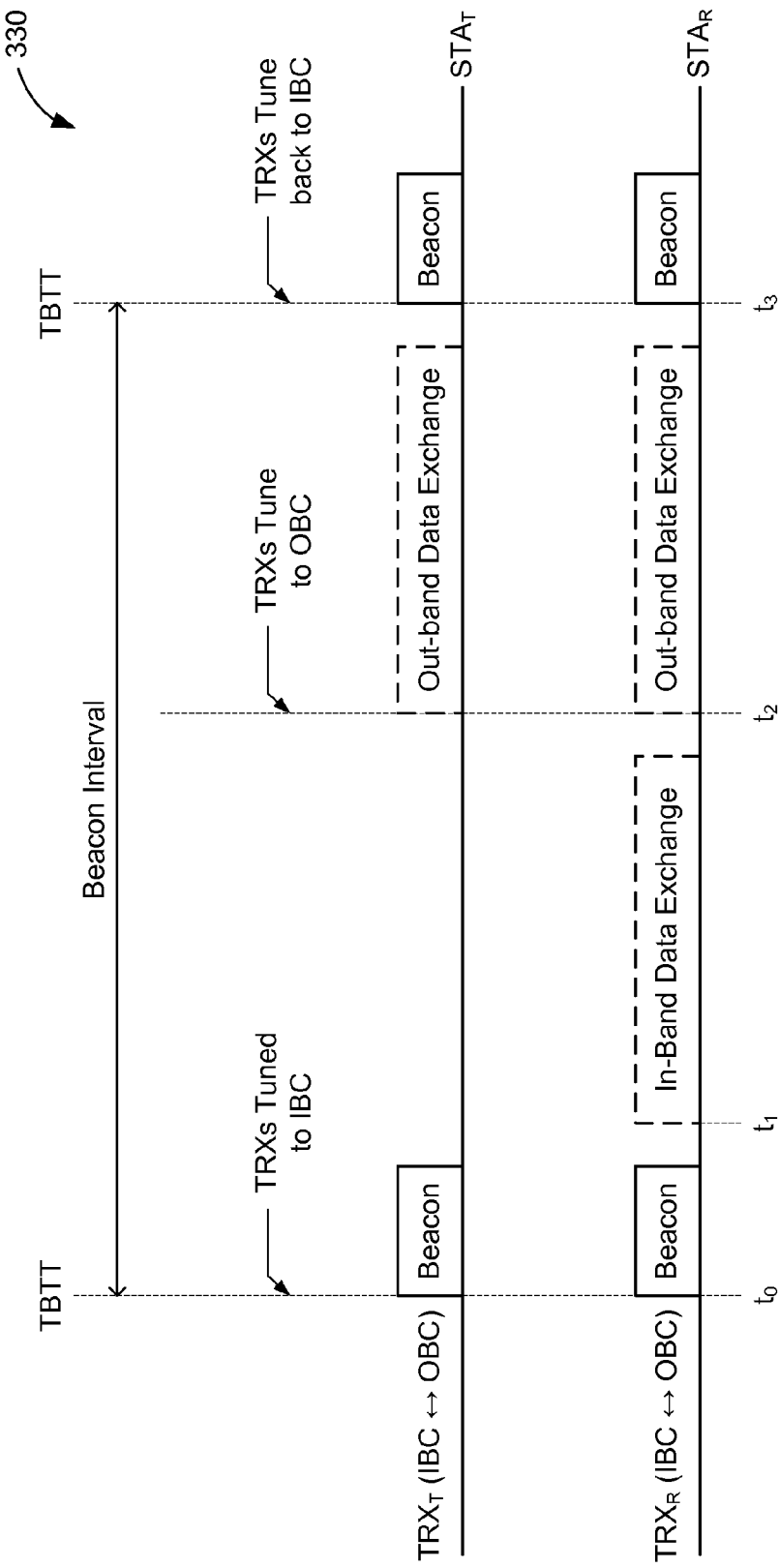
Figure 3D:
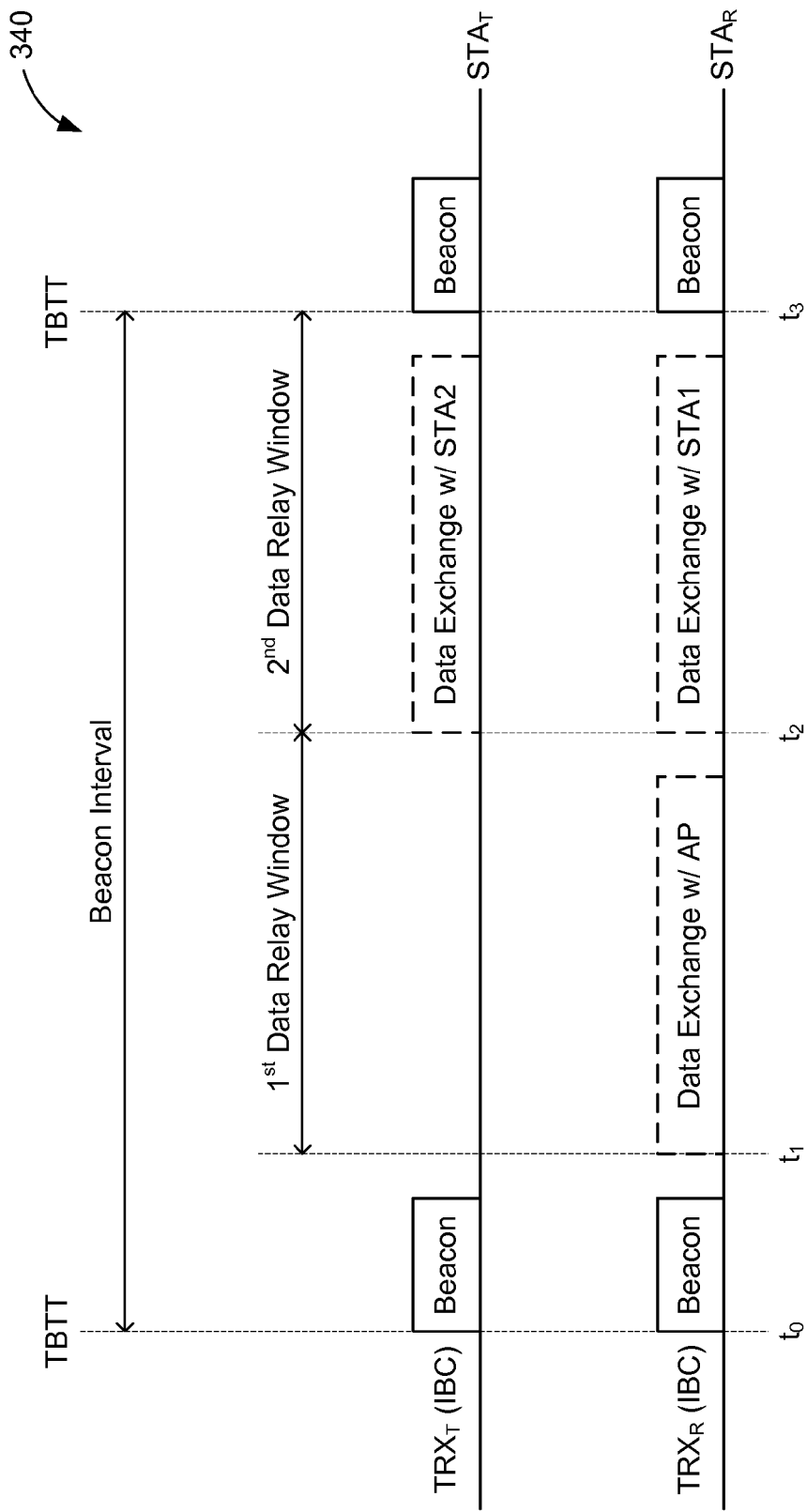

FIGS. 3A-3D are exemplary timing diagrams illustrating various relay link configurations, in accordance with some embodiments. In particular, FIG. 3A shows an embodiment wherein both the relay STA and the target STA have at least two transceivers that may be tuned to different channels and/or frequencies. FIG. 3B shows an embodiment wherein the relay STA, but not the target STA, has at least two transceivers that may be tuned to different channels and/or frequencies. FIG. 3C shows an embodiment wherein the relay STA has a single transceiver that is tunable to different channels and/or frequencies. FIG. 3D shows an embodiment wherein the relay STA and the target STA each have a single transceiver that is tuned to a single channel and/or frequency.

With reference to FIG. 3A, the target STA ($STA_T$) includes a first transceiver ($TRX1_T$) tuned to an in-band channel (IBC) to receive beacon frames from, and maintain a connection with, a corresponding AP. The target STA also includes a second transceiver ($TRX2_T$) tuned to an out-band channel (OBC) to communicate with the relay STA. The relay STA ($STA_R$) includes a first transceiver ($TRX1_R$) tuned to the out-band channel to communicate with the target STA. The relay STA also includes a second transceiver ($TRX2_R$) tuned to the in-band channel (IBC) to receive beacon frames from, and maintain a connection with, the corresponding AP. Because both the target and relay STAs have dual transceivers, they may communicate with one another and the AP simultaneously, with minimal (if any) interference or interruption.

At time $t_0$, the target STA receives a beacon frame via its first transceiver and the relay STA receives the beacon frame via its second transceiver. At the same time, data exchanges between the target STA and the relay STA may proceed uninterrupted over the out-band channel. The relay STA may then begin receiving data from the AP via its second transceiver at time $t_1$. For example, the received data may be intended for the relay STA and/or the target STA. Moreover, the relay STA may immediately relay any data intended for the target STA over the out-band channel (e.g., as soon as such data becomes available) while continuing to maintain the data exchange with the AP over the in-band channel. At time $t_2$, both the relay STA and the target STA may receive a subsequent beacon frame over the in-band channel, for example, without interrupting any ongoing data exchanges between the two STAs on the out-band channel.

With reference to FIG. 3B, the target STA includes a single transceiver ($TRX_T$) that is tunable to either the in-band channel (e.g., to receive beacon frames from an AP) or the out-band channel (e.g., to communicate with the relay STA). The relay STA includes a first transceiver tuned to the out-band channel (OBC) to communicate with the target STA. The relay STA also includes a second transceiver tuned to the in-band channel (IBC) to receive beacon frames from, and maintain a connection with, the AP. Because the target STA has only the single transceiver, it may need to tune its transceiver back and forth between the in-band channel (IBC) and the out-band channel (OBC). For example, the target STA may periodically tune its transceiver to the in-band channel (e.g., based on the TBTTs or beacon interval) to receive beacons from the AP, and subsequently tune its transceiver to the out-band channel (e.g., once the beacon is received) to communicate with the relay STA.

At time $t_0$, the transceiver of the target STA is tuned to the in-band channel to receive a beacon frame broadcast at the start of a beacon interval. The relay STA also receives this beacon frame via its second transceiver. After receiving the beacon frame, the target STA tunes its transceiver to the out-band channel at time $t_1$ to prepare for possible data exchanges with the relay STA. At this time (e.g., time $t_1$), the relay STA may begin receiving data from the AP via its second transceiver. For example, the received data may be intended for the relay STA and/or the target STA. Moreover, the relay STA may immediately relay any data intended for the target STA over the out-band channel (e.g., as soon as such data becomes available) while continuing to maintain the data exchange with the AP over the in-band channel. At time $t_2$, the target STA tunes its transceiver back to the in-band channel to receive a beacon frame broadcast at the start of a subsequent beacon interval. The relay STA receives this beacon frame via its second transceiver, which is already tuned to the in-band channel. However, at this time any ongoing data exchanges between the relay STA and the target STA may be suspended until the target STA tunes its transceiver back to the out-band channel.

With reference to FIG. 3C, the relay STA includes a single transceiver ($TRX_R$) that is tunable to either the in-band channel (e.g., to receive beacon frames from an AP) or the out-band channel (e.g., to communicate with one another). Because the relay STA has only the single transceiver, it may need to tune its transceiver back and forth between the in-band channel and the out-band channel. For example, the relay STA may periodically tune its transceiver to the in-band channel (e.g., based at least in part on the TBTTs or beacon interval) to receive beacons and/or data from the AP, and subsequently tune its transceiver to the out-band channel (e.g., after a scheduled duration) to communicate with the target STA.

For some embodiments, the relay STA may switch between the in-band channel and the out-band channel at regular or periodic switching intervals. For example, the AP may send the periodic switching schedule to at least the relay STA via a management frame or an action frame. For other embodiments, the AP may instruct at least the relay STA to switch to the out-band channel after sending a sufficient amount of data to the relay STA and/or no more buffered data is available for the relay STA. For example, the AP may send the instruction, including a time window for the out-band communication, to at least the relay STA via a management frame or an action frame. In either embodiment, the relay STA may immediately switch back to the in-band channel once all of the relay data has been successfully forwarded to the target STA. Further, the relay STA may send a notification message to the AP upon switching back to the in-band channel to indicate that it is ready to receive additional data from the AP.

At time $t_0$, the transceivers of both the target STA and the relay STA are tuned to the in-band channel to receive a beacon frame broadcast at the start of a beacon interval. After receiving the beacon frame, the relay STA may begin receiving data from the AP for a scheduled period, between times $t_1$ and $t_2$. For example, the received data may be intended for the relay STA and/or the target STA. Then, at time $t_2$, both the target STA and the relay STA tune their respective transceivers to the out-band channel to communicate with one another. More specifically, the relay STA may relay any data intended for the target STA during a scheduled period, between times $t_2$ and $t_3$. At time $t_3$, both the target STA and the relay STA tune their respective transceivers back to the in-band channel to receive a beacon frame broadcast at the start of a subsequent beacon interval. Thus, any ongoing data exchanges between the relay STA and the target STA may be suspended until both of their transceivers are tuned backed to the out-band channel.

With reference to FIG. 3D, both the target STA and the relay STA include a single transceiver ($TRX_T$ and $TRX_R$, respectively) tuned to the in-band channel (e.g., the transceivers cannot be tuned to any other frequencies). Because the target STA and the relay STA are both tuned only to the in-band channel, they may each need to dedicate a portion of each beacon interval to communicating with the AP and another portion of the beacon interval to communicating with one another. For example, after receiving a beacon frame from the AP, the relay STA may schedule a data exchange with the AP (e.g., coinciding with a first data relay window), and subsequently schedule a data exchange with the target STA (e.g., coinciding with a second relay window). Similarly, the target STA may schedule a data exchange with the relay STA after receiving the beacon frame from the AP (e.g., either before or during the start of the second data relay window).

For some embodiments, the first and second data relay windows may be scheduled at regular or periodic switching intervals. For example, the AP may send the periodic switching schedule to at least the relay STA via a management frame or an action frame. For other embodiments, the AP may instruct the relay STA to initiate a data exchange with the target STA after sending a predetermined amount of data to the relay STA and/or until no more buffered data is available for the relay STA. For example, the AP may send the instruction, including a time window for the data exchange, to at least the relay STA via a management frame or an action frame.

At time $t_0$, both the target STA and the relay STA receive a beacon frame broadcast at the start of a beacon interval. After receiving the beacon frame, the relay STA may begin receiving data from the AP for a scheduled period, between times $t_1$ and $t_2$ (e.g., coinciding with a first data relay window). For example, the received data may be intended for the relay STA and/or the target STA. At the end of the first data relay window (e.g., at time $t_2$), the relay STA initiates a data exchange with the target STA for a scheduled period, between times $t_2$ and $t_3$ (e.g., coinciding with a second data relay window). At time $t_3$, both the target STA and the relay STA receive another beacon frame broadcast at the start of a subsequent beacon interval. Thus, any ongoing data exchanges between the relay STA and the target STA may be suspended until the relay STA initiates a subsequent data exchange with the target STA.

Figure 4:
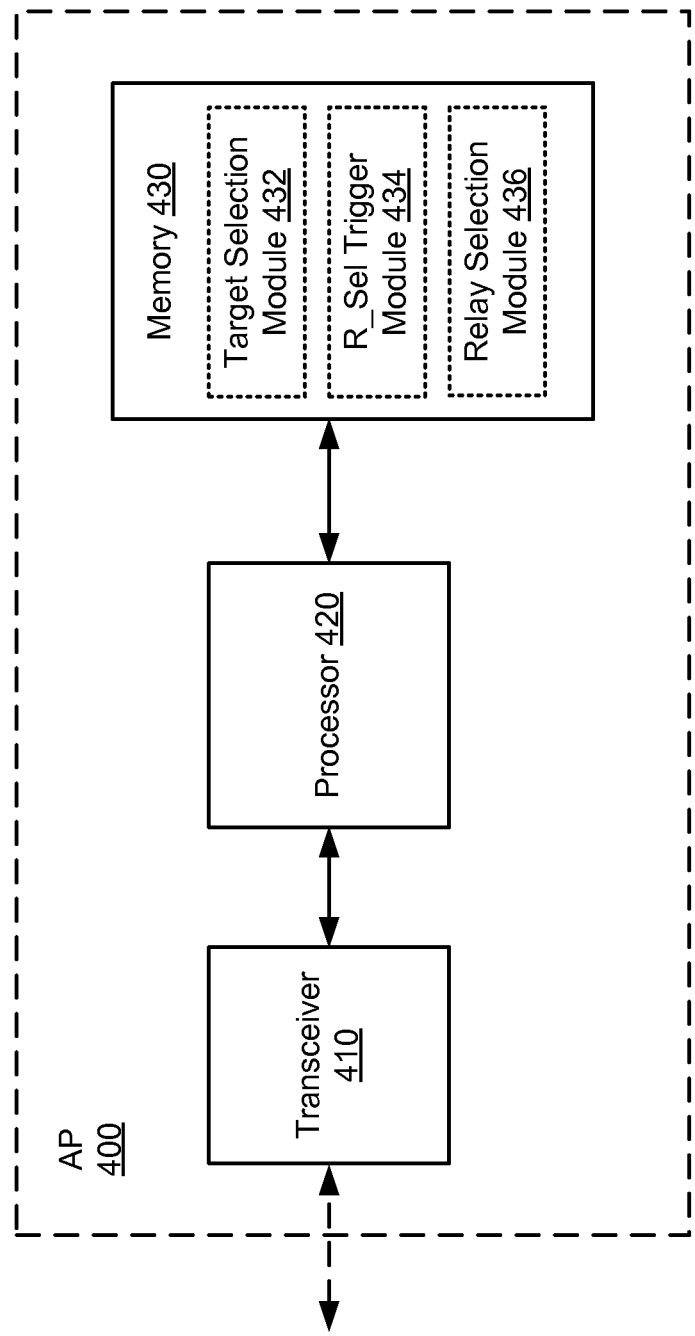
FIG. 4 shows a block diagram of an access point (AP) in accordance with some embodiments.

FIG. 4 shows an AP 400 that is one embodiment of the AP 110 of FIG. 1. The AP 400 includes a transceiver 410, a processor 420, and a memory 430. The transceiver 410 may be used to communicate wirelessly with one or more STAs, with one or more other APs, and/or with other suitable wireless devices. Processor 420, which is coupled to transceiver 410 and memory 430, may be any suitable processor capable of executing scripts or instructions of one or more software programs stored in the AP 400 (e.g., within memory 430). Although not shown for simplicity, the AP 400 may also include a network interface to communicate with a WLAN server (not shown for simplicity) associated with the WLAN 120 of FIG. 1 either directly or via one or more intervening networks, and to transmit signals.

Memory 430 may include a non-transitory computer-readable medium (e.g., one or more nonvolatile memory elements, such as EPROM, EEPROM, Flash memory, a hard drive, etc.) that may store the following software modules:
  a target selection module 432 to identify a target STA with low MU efficiency;
  a relay selection (R_Sel) trigger module 434 to generate an R_Sel trigger frame that causes the target STA to query a set of candidate STAs to relay data between the AP 400 and the target STA; and
  a relay selection module 436 to select a relay STA based on one or more query responses from the set of candidate STAs.

Each software module includes instructions that, when executed by processor 420, causes the AP 400 to perform the corresponding functions. The non-transitory computer-readable medium of memory 430 thus includes instructions for performing all or a portion of the operations described below with respect to FIGS. 6 and 7.

Processor 420, which is shown in the example of FIG. 4 as coupled to transceiver 410 and memory 430, may be one or more suitable processors capable of executing scripts or instructions of one or more software programs stored in AP 400 (e.g., within memory 430). For example, processor 420 may execute the target selection module 432 to identify a target STA with low MU efficiency. Processor 420 may also execute the R_Sel trigger module 434 to generate an R_Sel trigger frame that causes the target STA to query a set of candidate STAs to relay data between the AP 400 and the target STA. Still further, processor 420 may execute the relay selection module 436 to select a relay STA based one or more query responses from the set of candidate STAs.

Figure 5:
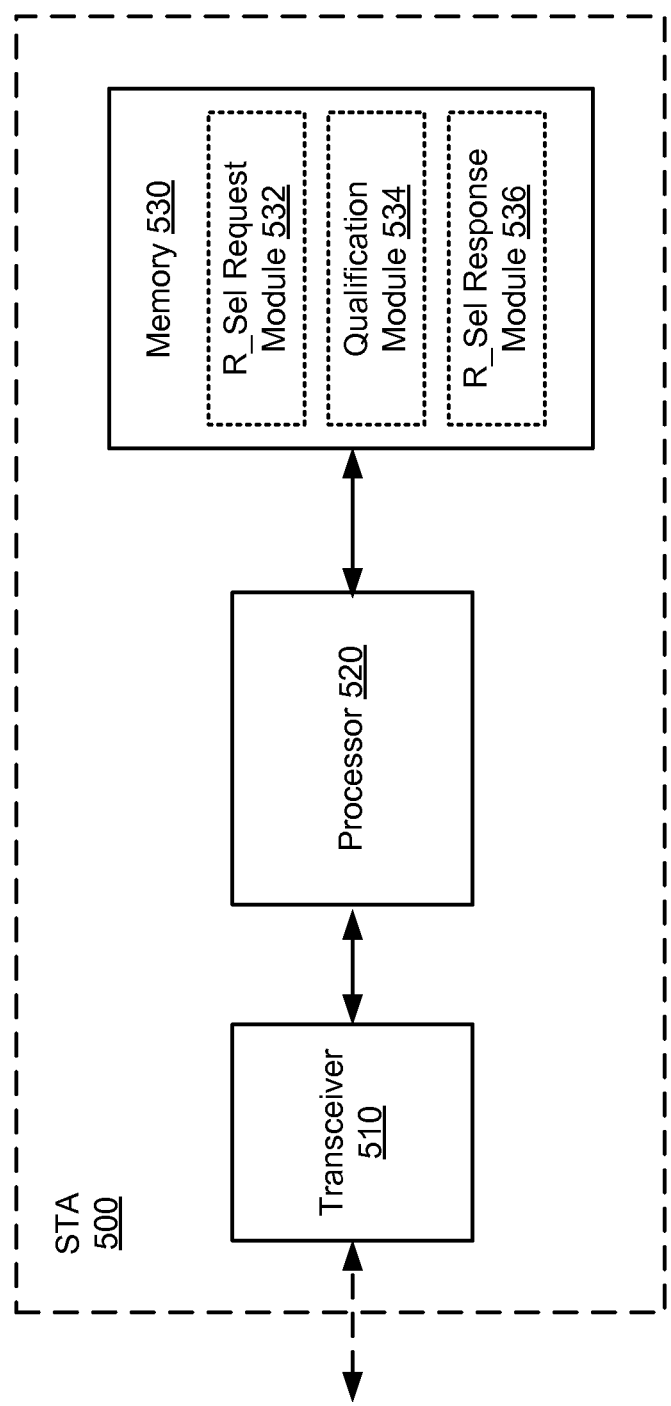
FIG. 5 shows a block diagram of a wireless station (STA) in accordance with some embodiments.

FIG. 5 shows a block diagram of a wireless STA 500 in accordance with some embodiments. Specifically, the STA 500 may be one embodiment of at least one of the stations STA1-STA6 of FIG. 1. The STA 500 may include, but is not limited to, a transceiver 510, a processor 520, and a memory 530. The transceiver 510 may be used to transmit signals to and receive signals from the AP 110 and/or other STAs. In addition, the transceiver 510 can be used to scan the surrounding environment to detect and identify nearby access points (e.g., access points within wireless communication range of the STA 500) and/or other STAs.

Memory 530 may include a non-transitory computer-readable medium (e.g., one or more nonvolatile memory elements, such as EPROM, EEPROM, Flash memory, a hard drive, etc.) that can store the following software modules:
  a relay selection (R_Sel) request module 532 to generate an R_Sel request frame to be transmitted to a set of candidate STAs for purposes of identifying a potential relay STA;
  a qualification module 534 to determine whether the STA 500 is qualified to act as a relay between an AP and a target STA based at least in part on a received R_Sel request frame; and
  a relay selection (R_Sel) response module 536 to generate an R_Sel response frame indicating that the STA 500 is qualified to act as a relay between the AP and the target STA.

Each software module includes instructions that, when executed by processor 520, causes STA 500 to perform the corresponding functions. The non-transitory computer-readable medium of memory 530 thus includes instructions for performing all or a portion of the operations described below with respect to FIG. 7.

Processor 520, which is shown in the example of FIG. 5 as coupled to transceiver 510 and memory 530, may be one or more suitable processors capable of executing scripts or instructions of one or more software programs stored in STA 500 (e.g., within memory 530). For example, processor 520 may execute the R_Sel request module 532 to generate an R_Sel request frame to be transmitted to a set of candidate STAs for purposes of identifying a potential relay STA. Processor 520 may also execute the qualification module 534 to determine whether the STA 500 is qualified to act as a relay between an AP and a target STA based at least in part on a received R_Sel request frame. Still further, the processor 520 may execute the R_Sel response module 536 to generate an R_Sel response frame indicating that the STA 500 is qualified to act as a relay between the AP and the target STA.

Figure 6:
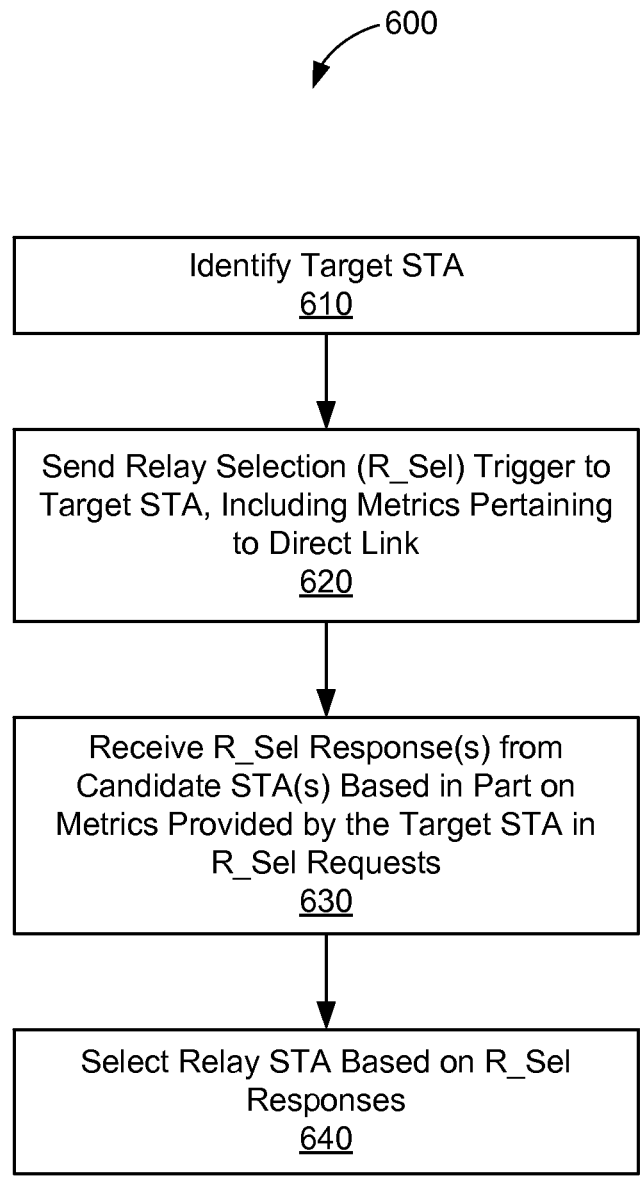
FIG. 6 shows an illustrative flow chart depicting an opportunistic relay selection operation, in accordance with some embodiments.

FIG. 6 shows an illustrative flow chart depicting an opportunistic relay selection operation 600, in accordance with some embodiments. For example, with reference to FIG. 1, the relay selection operation 600 may be implemented by the AP 110 upon detecting that the network load is too high (e.g., exceeds a threshold level). Accordingly, the AP 110 may identify a target STA for which to relay communications (610). For example, the target STA may have a low MU efficiency (e.g., its MU exceeds a threshold percentage) and may thus benefit from having its data relayed through another STA in the network. Similarly, the load of the network may be improved by "offloading" the target STA (e.g., by terminating the direct link between the AP 110 and the target STA). As described above, the AP 110 may select a particular STA as the target STA if the highest achievable MCS (e.g., while maintaining at least a threshold PER) for that STA is below a threshold MCS. Alternatively, and/or in addition, the AP 110 may select a particular STA as the target STA if the goodput (e.g., MCS*(1−PER)) of a direct link between the AP 110 and that STA, based on a given MCS, is below a threshold goodput.

The AP 110 may then send an R_Sel trigger frame to the target STA (620), wherein the R_Sel trigger frame includes metrics pertaining to the direct link between the AP 110 and the target STA. For example, the metrics may include the highest achievable MCS at a threshold PER in the direct link, the maximum goodput of the direct link, and/or the MU attributable to the target STA. More generally, the metrics may include any information about the direct link that may be used to filter out unqualified STAs from participating in the relay selection process. Further, the R_Sel trigger frame causes the target STA to send (e.g., broadcast) an R_Sel request frame to one or more other STAs in the network. Specifically, the R_Sel request frame may be used to solicit candidate STAs that can potentially serve as a relay between the AP 110 and the target STA.

The AP 110 receives one or more R_Sel responses from a set of candidate STAs based at least in part on the metrics provided to the candidate STAs by the target STA in one or more R_Sel request frames (630). As described above, the set of candidate STAs may include any STAs in the vicinity of the target STA that are able to receive the R_Sel request frame. For some embodiments, only a subset of qualified candidate STAs may send R_Sel responses to the AP 110. For example, a candidate STA may be qualified if, while acting as a relay: (1) there would be sufficient throughput gain in a first relay link between the AP 110 and the candidate STA (e.g., a throughput of the first relay link is greater than the throughput of the direct link by a threshold amount); (2) there would be sufficient throughput gain in a second relay link between the candidate STA and the target STA (e.g., a throughput of the second relay link is greater than the throughput of the direct link by a threshold amount); and (3) the candidate STA has sufficient battery life to sustain operations for at least a threshold duration.

Finally, the AP 110 selects a relay STA based on the R_Sel response frames received from a number of qualified STAs (640). For example, each R_Sel response frame may include information about a first relay link between the AP 110 and a corresponding qualified candidate STA as well as information about a second relay link between the corresponding qualified STA and the target STA. For example, the information about the first relay link may include an RSSI value of AP 110 measured by the candidate STA, a highest achievable MCS at a threshold PER in the first relay link, a maximum goodput of the first relay link, and/or an estimated throughput of the first relay link. The information about the second relay link may include a channel and/or frequency for the second relay link and/or the estimated throughput of the second relay link. For some embodiments, the AP 110 may select a relay STA that maximizes throughput for the target STA. Additionally, selection of the relay STA may depend on the channel and/or frequency of the second relay link (e.g., the out-band link) associated with each qualified STA.

Figure 7:
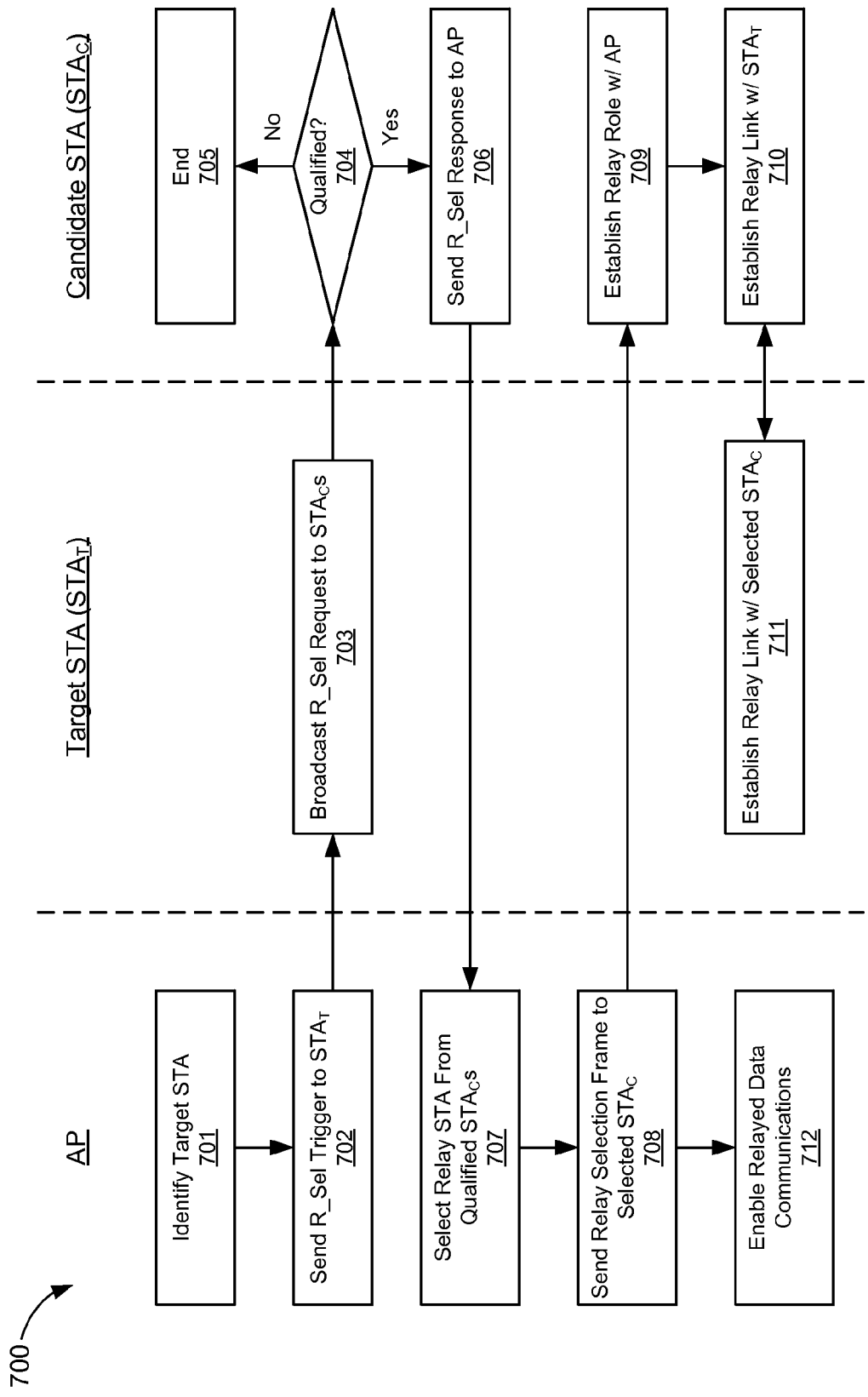
FIG. 7 shows an illustrative flow chart depicting a more detailed embodiment of the opportunistic relay selection operation of FIG. 6.

FIG. 7 shows an illustrative flow chart 700 depicting a more detailed embodiment of the opportunistic relay selection operation of FIG. 6. For example, with reference to FIG. 1, the AP 110 may initiate the relay selection operation 700 by identifying a target STA for which to relay communications (701). As described above, the AP 110 may select a particular STA as the target STA if the highest achievable MCS at a threshold PER for that STA is below a threshold MCS. Alternatively, and/or in addition, the AP 110 may select a particular STA as the target STA if the goodput of a direct link between the AP 110 and that STA, based on a given MCS, is below a threshold goodput. The AP 110 may then send an R_Sel trigger frame to the target STA (702). For some embodiments, the R_Sel trigger frame may include information (e.g., metrics) pertaining to the direct link between the AP 110 and the target STA. For example, the information may include the highest achievable MCS at a threshold PER in the direct link, the maximum goodput of the direct link, and/or the MU attributable to the target STA.

The target STA (STA$_T$) broadcasts an R_Sel request frame to a set of candidate STAs in response to the R_Sel trigger frame (703). The set of candidate STAs may include any STAs that are in the vicinity of the target STA and/or are able to receive the R_Sel request frame. For some embodiments, the R_Sel request frame may contain information about the direct link between the AP 110 and the target STA. For example, the R_Sel request frame may include the metrics obtained from the R_Sel trigger frame (e.g., such as the highest achievable MCS, the maximum goodput, and/or the MU) and/or other information measured by the target STA (e.g., such as an RSSI value and/or throughput of the direct link). For some embodiments, the R_Sel request frame may also include information about the load per candidate out-band channel (e.g., to be used for a second relay link) as measured by the target STA.

Upon receiving the R_Sel request frame, each candidate STA (STAc) determines whether it is qualified to act as a relay between the AP 110 and the target STA (704). For some embodiments, each candidate STA may determine its qualifications based on the information included in the R_Sel request frame received from the target STA. For example, a candidate STA may be "qualified" if, while acting as a relay: (1) there would be sufficient throughput gain in a first relay link between the AP 110 and the candidate STA; (2) there would be sufficient throughput gain in a second relay link between the candidate STA and the target STA; and (3) the candidate STA has sufficient battery life to sustain operations for at least a threshold duration.

For some embodiments, a candidate STA may determine that there is sufficient throughput gain in the first relay link if the maximum goodput of the first relay link (e.g., which may be determined based on an RSSI value measured by the candidate STA) is at least M times greater than the maximum goodput of the direct link (e.g., which may be obtained from the R_Sel request frame). Alternatively, and/or in addition, the candidate STA may determine that there is sufficient throughput gain in the first relay link if the highest achievable MCS at a threshold PER in the first relay link (e.g., which may be determined based on the RSSI value measured by the candidate STA) is at least M times greater than the highest achievable MCS at a threshold PER in the direct link (e.g., which may be obtained from the R_Sel request frame). Still further, for some embodiments, the candidate STA may determine that there is sufficient throughput gain in the first relay link if the RSSI value measured by the candidate STA is at least a threshold amount greater than the RSSI value measured by the target STA (e.g., which may also be obtained from the R_Sel request frame).

For some embodiments, the candidate STA may determine that there is sufficient throughput gain in the second relay link if the estimated throughput of the second relay link is at least N times greater than the estimated throughput of the direct link (e.g., which may be obtained from the R_Sel request frame). As described above, the second relay link may coincide with a different channel and/or frequency than the first relay link. Thus, in order to estimate the throughput of the second relay link, the candidate STA may consider the available MU for each candidate relay channel (e.g., out-band and/or in-band channel). More specifically, the estimated throughput of the second relay link may depend on the maximum available medium usage across all candidate relay channels.

A candidate STA may not respond to the R_Sel request if it determines that it is not qualified, because the throughput gain in either the first relay link or the second relay link is insufficient and/or the remaining charge on its battery is too low (705). However, if the candidate STA determines that it is qualified to act as a relay between the AP 110 and the target STA (e.g., all of the aforementioned conditions are satisfied), it may then send an R_Sel response frame to the AP 110 (706). For some embodiments, the R_Sel response frame may include information (e.g., one or more metrics) about a first relay link between the AP 110 and the candidate STA as well as information about a second relay link between the candidate STA and the target STA. For example, the information about the first relay link may include the RSSI value of AP 110 measured by the candidate STA, the highest achievable MCS at a threshold PER in the first relay link, the maximum goodput of the first relay link, and/or the estimated throughput of the first relay link. The information about the second relay link may include a channel and/or frequency for the second relay link and/or the estimated throughput of the second relay link.

The AP 110 then selects one of the qualified candidate STAs to become a relay STA (707), and sends a relay selection frame to the selected qualified candidate STA (708). For some embodiments, the AP 110 may select the relay STA based at least in part on the information provided within the R_Sel response frames. For example, the AP 110 may select the qualified candidate STA that maximizes throughput for the target STA. Alternatively, and/or in addition, the AP 110 may select a qualified candidate STA that would relay data to the target STA on an out-band channel furthest from, and/or least likely to interfere with, the in-band channel. The AP 110 may send the relay selection frame to the relay STA or the target STA (e.g., as a unicast message), or to both the relay STA and the target STA (e.g., as a multicast message). For some embodiments, the relay selection frame may specify the channel and/or frequency (e.g., the out-band channel) to be used for the second relay link. Further, for some embodiments, the relay selection frame may include association and authentication information to enable secure communications between the relay STA and the target STA.

Upon receiving the relay selection frame from the AP 110, the selected candidate STA may establish a relay role with the AP 110 (709), and then set up the second relay link with the target STA (710). Similarly, the target STA may establish the second relay link with the selected candidate STA (711). For example, the STA1 and STA2 may establish the second relay link using known relay setup procedures (e.g., as defined by the IEEE 802.11 specification). Once the second relay link is established, the AP 110 may enable relayed data communications with the target STA via the selected relay STA (712). More specifically, the AP 110 may send any data intended for the target STA to relay STA, which then forwards that data to the target STA. Similarly, the target STA may send any data intended for the AP 110 to the relay STA, which then forwards that data to the AP 110.

Figure 8:
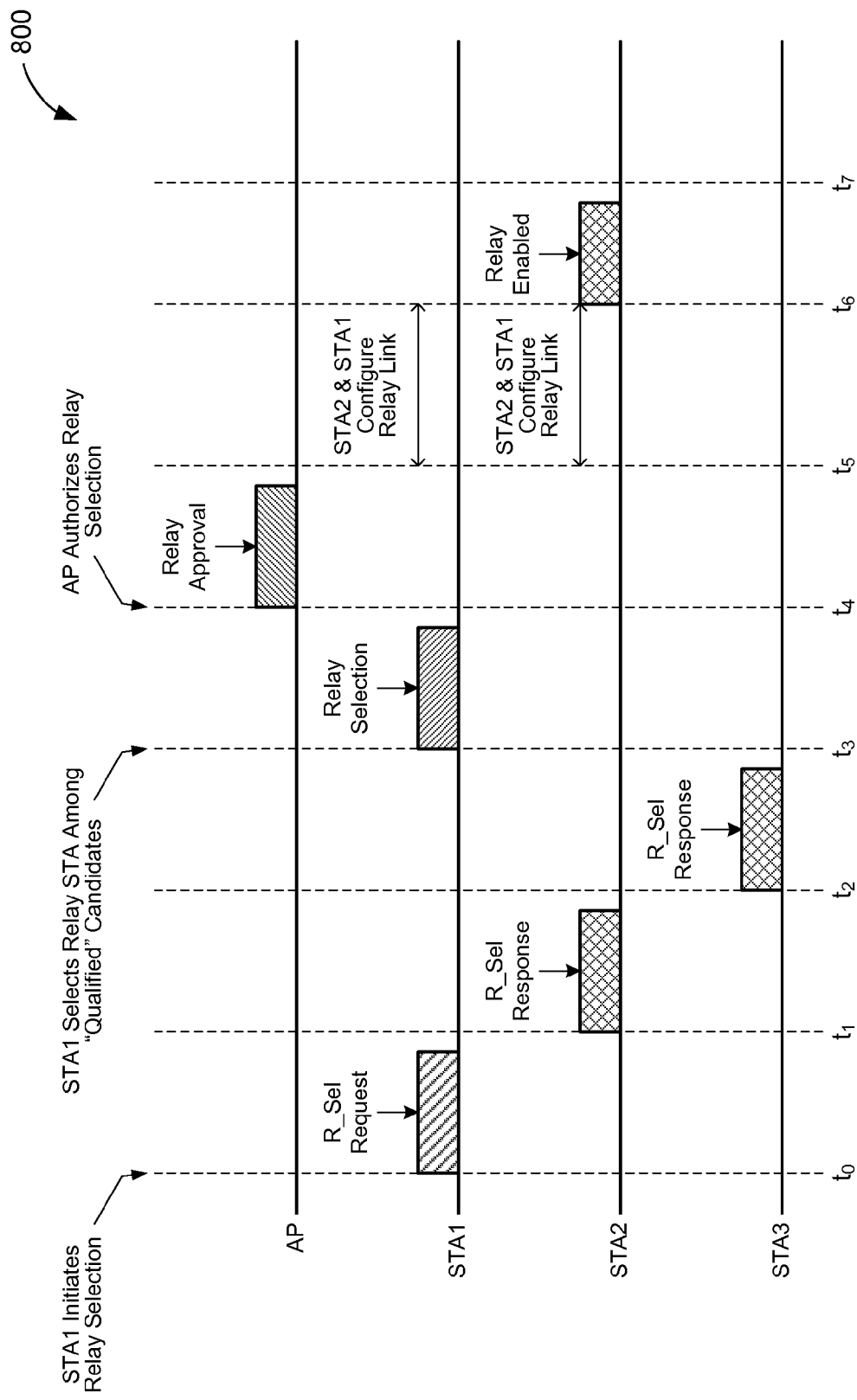
FIG. 8 is an exemplary timing diagram illustrating an opportunistic relay selection operation, in accordance with other embodiments.

FIG. 8 is an exemplary timing diagram illustrating an opportunistic relay selection operation 800, in accordance with other embodiments. More specifically, the relay selection operation 800 may be initiated by a STA (e.g., the target STA) rather than an AP (e.g., as described above with respect to FIGS. 2-7). With reference, for example, to FIG. 1, a target STA (e.g., STA1) may initiate the relay selection operation 800 (e.g., at time $t_0$) upon detecting that the total network load (e.g., of WLAN 120) exceeds a threshold level. For some embodiments, STA1 may initiate the relay selection operation 800 if it determines that its MU efficiency is low (e.g., its MU exceeds a threshold percentage). Thus, STA1 may detect an opportunity to reduce the network load and/or improve the throughput of communications with the AP 110 by routing communications to and from the AP 110 through another STA acting as a relay.

At time $t_0$, the target STA initiates the relay selection operation 800 by transmitting (e.g., broadcasting) an R_Sel request frame to one or more STAs in the network. As described above, the R_Sel request frame may be used to solicit candidate STAs on the WLAN 120 that can potentially serve as a relay between STA1 and the AP 110. For some embodiments, the R_Sel request frame may include information (e.g., one or more metrics) about the direct link between STA1 and the AP 110. For example, the information may include the highest achievable MCS at a threshold PER in the direct link, the maximum goodput of the direct link, the MU attributable to STA1, an RSSI value for the AP 110 as measured by STA1, and/or the throughput of the direct link as measured by STA1. For some embodiments, the R_Sel request frame may also include information about the medium load for each candidate out-band channel as measured by STA1.

A set of candidate STAs receive the R_Sel request frame from the target STA and determine whether they are qualified to act as a relay between the target STA and the AP 110 (e.g., at time $t_1$). The set of candidate STAs may include any STAs (e.g., STA2-STA6) on the WLAN 120 that are in the vicinity of STA1 and/or are able to receive the R_Sel request frame. Upon receiving the R_Sel request frame, each candidate STA analyzes the information included in the R_Sel request frame to determine whether that STA is qualified to act as a relay between the AP 110 and STA1. As described above, a candidate STA may be qualified if, while acting as a relay: (1) there would be sufficient throughput gain in a first relay link between the AP 110 and the candidate STA (e.g., a throughput of the first relay link is greater than a throughput of the direct link by a threshold amount); (2) there would be sufficient throughput gain in a second relay link between the candidate STA and STA1 (e.g., a throughput of the second relay link is greater than a throughput of the direct link by a threshold amount); and (3) the candidate STA has sufficient battery life (e.g., there is enough charge stored on the battery for the candidate STA to remain operable for a threshold amount of time).

The throughput of the direct link may be estimated using Equation 1 and the throughput of the first relay link may be estimated using Equation 2 (e.g., as described above with respect to FIG. 2). For some embodiments, a candidate STA may determine that there is sufficient throughput gain in the first relay link if the estimated throughput of the first relay link is at least M times greater than the estimated throughput of the direct link (e.g., $Thrp[RL_1]>M*Thrp[DL]$). More specifically, the throughput gain in the first relay link may be sufficient if the maximum goodput of the first relay link is at least M times greater than the maximum goodput of the direct link (e.g., $MCS_{R1}*(1-PER)>M*MCS_D*(1-PER)$). Thus, the throughput gain in the first relay link may be sufficient if the highest achievable MCS in the first relay link (e.g., while maintaining at least a threshold PER) is at least M times greater than the highest achievable MCS in the direct link (e.g., while maintaining at least a threshold PER). Alternatively, and/or in addition, the throughput gain in the first relay link may be sufficient if the RSSI value ($RSSI_C$) at the candidate STA is at least X times greater than the RSSI value ($RSSI_T$) at STA1 (e.g., $RSSI_C>X*RSSI_T$), where X is chosen so that the maximum goodput in the first relay link will be at least M times greater than the maximum goodput in the direct link.

The throughput of the second relay link may be estimated using Equation 3 (e.g., as described above with respect to FIG. 2). For some embodiments, a candidate STA may determine that there is sufficient throughput gain in the second relay link if the estimated throughput gain in the second relay link is at least a threshold greater than the throughput of the direct link. For example, the throughput gain in the second relay link may be sufficient if the estimated throughput of the second relay link is at least N times greater than the estimated throughput of the direct link (e.g., $Thrp[RL_2]>N*Thrp[DL]$).

At time $t_1$, each qualified candidate STA sends an R_Sel response frame to the target STA in response to receiving the R_Sel request frame. As described above, a candidate STA may be qualified to act as a relay if there is sufficient throughput gain in its first and second relay links and it has sufficient battery life to sustain a threshold period of operation. In this example, only STA2 and STA3 are qualified STAs. Thus, STA2 sends its R_Sel response frame at time $t_2$, and STA3 sends its R_Sel response frame at time $t_3$. For some embodiments, each R_Sel response frame may include information (e.g., one or more metrics) about a first relay link between the AP 110 and a qualified candidate STA as well as information about a second relay link between the qualified candidate STA and the target STA (e.g., STA1). For example, the information about the first relay link may include the RSSI value for the AP 110 as measured by the candidate STA, the highest achievable MCS at a threshold PER in the first relay link, the maximum goodput of the first relay link, and/or the estimated throughput of the first relay link. The information about the second relay link may include a channel and/or frequency for the second relay link and/or the estimated throughput of the second relay link.

The target STA then selects one of the qualified STAs to act as a relay STA (e.g., at time $t_3$) based on the information provided within the R_Sel response frames. This is in contrast to the opportunistic relay selection operation of FIG. 2, in which the AP 110 selects one of the candidate STAs to act as the relay STA. For some embodiments, STA1 may select the qualified STA that maximizes throughput between the AP 110 and STA1. For example, STA1 may compare the lesser of the throughputs in the first relay link or the second relay link, for each qualified STA, and select the STA that yields the highest throughput when acting as a relay. For some embodiments, the relay STA selection may also depend on the channel and/or frequency of the second relay link associated with each qualified STA. For example, it may desirable to select a relay STA that communicates on an out-band channel further from, and/or least likely to interfere with, the in-band channel used by the AP 110.

After selecting a relay STA, the target STA may send a relay selection frame, at time $t_3$, to the selected relay STA and/or the AP 110. For example, the relay selection frame may be unicast to STA2 or multicast to both STA2 and the AP 110. For some embodiments, the relay selection frame may specify the channel and/or frequency (e.g., the out-band channel) to be used for the second relay link. Further, for some embodiments, the AP 110 may preside over the relay selection operation 800 by issuing a final authorization or approval of the relay selection (e.g., at time $t_4$). For example, the AP 110 may determine whether the network load would be improved by relaying data through the selected relay STA (e.g., STA2) to the target STA (e.g., STA1). More specifically, the AP 110 may authorize the relay selection proposed by the target STA if the relay configuration would improve and/or optimize the load on the WLAN 120.

At time $t_4$, the AP 110 sends a relay approval frame to the selected relay STA and/or the target STA. For example, the relay approval frame may be unicast to STA2 (e.g., and/or STA1) or multicast to both STA1 and STA2. For some embodiments, the relay approval frame may include association and authentication information (e.g., to enable secure communications between the target STA and the relay STA). More specifically, the authentication information may be used by both STA1 and STA2 to encrypt and/or decrypt messages transmitted over the second relay link, between STA1 and STA2.

At time $t_5$, the relay STA and the target STA establish the second relay link based at least in part on the information included in the relay selection frame. For example, STA1 and STA2 may establish the second relay link using known relay setup procedures (e.g., as defined by the IEEE 802.11 specification). Once the second relay link is established, at time $t_6$, STA2 (or STA1) sends a relay enabled message to the AP 110 to confirm that the relay STA is ready to begin relaying data between the AP 110 and the target STA (e.g., at time $t_7$). If the relay setup is unsuccessful, one of the STAs may send a termination frame to the AP 110 to terminate the relay selection operation 800. Alternatively, and/or additionally, the AP 110 may terminate the relay selection operation 800 if it does not receive a response from either of the STAs after a given interval of time.

Figure 9:
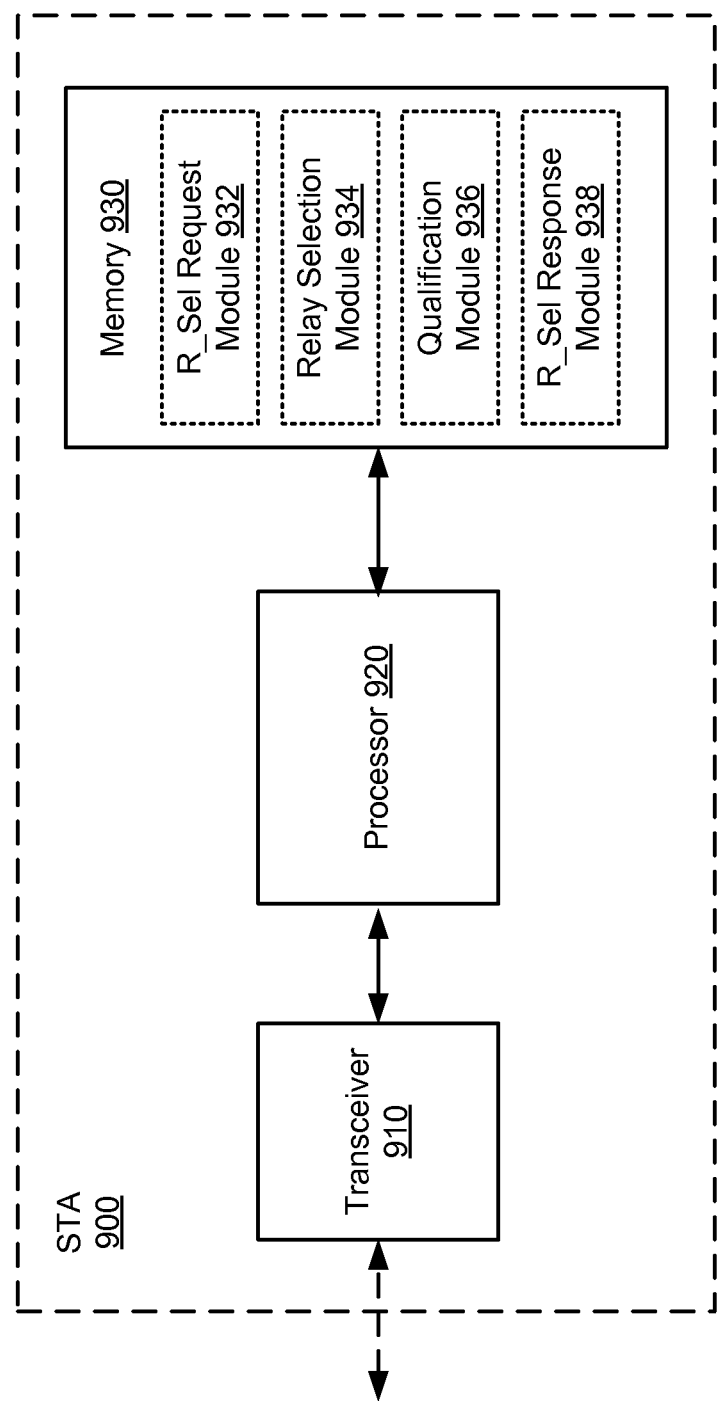
FIG. 9 shows a block diagram of a wireless STA in accordance with other embodiments.

FIG. 9 shows a block diagram of a wireless STA 900 in accordance with other embodiments. Specifically, the STA 900 may be one embodiment of at least one of the stations STA1-STA6 of FIG. 1. The STA 900 may include, but is not limited to, a transceiver 910, a processor 920, and a memory 930. The transceiver 910 may be used to transmit signals to and receive signals from the AP 110 and/or other STAs. In addition, the transceiver 910 can be used to scan the surrounding environment to detect and identify nearby access points (e.g., access points within wireless communication range of the STA 900) and/or other STAs.

Memory 930 may include a non-transitory computer-readable medium (e.g., one or more nonvolatile memory elements, such as EPROM, EEPROM, Flash memory, a hard drive, etc.) that can store the following software modules:

- a relay selection (R_Sel) request module 932 to generate an R_Sel request frame to be transmitted to a set of candidate STAs for purposes of identifying a potential relay STA;
- a relay selection module 934 to select a relay STA based on one or more R_Sel response frames received from the set of candidate STAs;
- a qualification module 936 to determine whether the STA 900 is qualified to act as a relay between an AP and a target STA based at least in part on a received R_Sel frame; and
- a relay selection (R_Sel) response module 938 to generate an R_Sel response frame indicating that the STA 900 is qualified to act as a relay between the AP and the target STA.

Each software module includes instructions that, when executed by processor 920, causes the STA 900 to perform the corresponding functions. The non-transitory computer-readable medium of memory 930 thus includes instructions for performing all or a portion of the operations described below with respect to FIGS. 10 and 11.

Processor 920, which is shown in the example of FIG. 9 as coupled to transceiver 910 and memory 930, may be any suitable processor capable of executing scripts or instructions of one or more software programs stored in STA 900 (e.g., within memory 930). For example, processor 920 may execute the R_Sel request module 932 to generate an R_Sel request frame to be transmitted to a set of candidate STAs for purposes of identifying a potential relay STA. Processor 920 may further execute the relay selection module 934 to select a relay STA based on one or more R_Sel response frames received from the set of candidate STAs. Still further, processor 920 may execute the qualification module 936 to determine whether the STA 900 is qualified to act as a relay between an AP and a target STA based at least in part on a received R_Sel request frame. Processor 920 may also execute the R_Sel response module 938 to generate an R_Sel response frame indicating that the STA 900 is qualified to act as a relay between the AP and the target STA.

Figure 10:
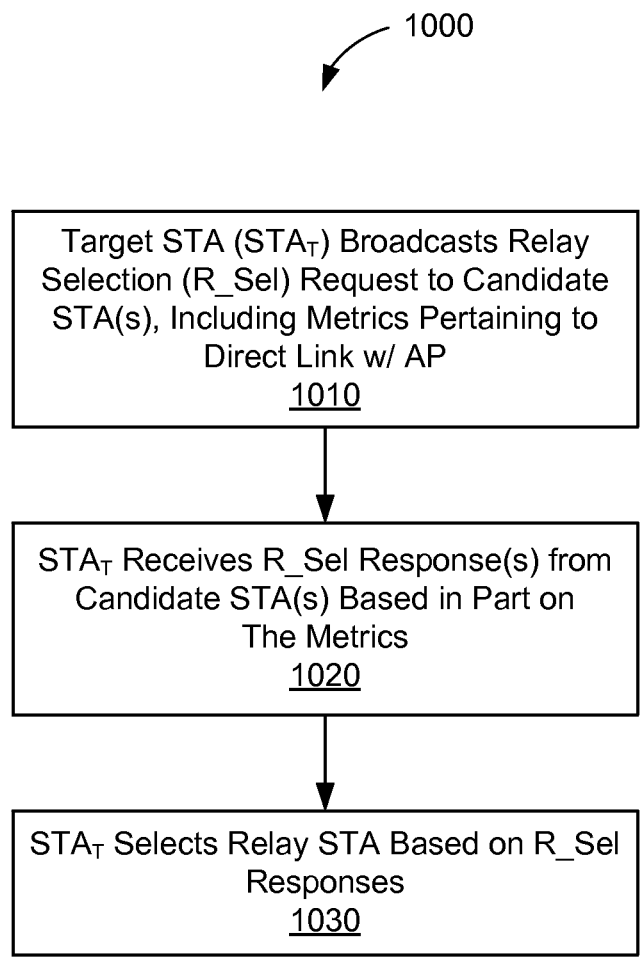
FIG. 10 shows an illustrative flow chart depicting an opportunistic relay selection operation, in accordance with other embodiments.

FIG. 10 shows an illustrative flow chart depicting an opportunistic relay selection operation 1000, in accordance with other embodiments. For example, with reference to FIG. 1, the relay selection operation 1000 may be initiated and performed by a target STA (e.g., STA1), rather than by the AP 110, upon detecting that the network load is too high (e.g., exceeds a threshold level) and/or its MU efficiency is too low (e.g., the MU by STA1 exceeds a threshold percentage). Accordingly, the target STA (e.g., STA1) may broadcast an R_Sel request frame to a set of candidate STAs (1010), wherein the R_Sel request frame includes metrics pertaining to the direct link between the AP 110 and the target STA. For example, the metrics may include the highest achievable MCS at a threshold PER in the direct link, the maximum goodput of the direct link, the MU attributable to the STA1, an RSSI value for the AP 110 as measured by STA1, and/or the throughput of the direct link as measured by STA1. Specifically, the R_Sel request frame may be used to solicit candidate STAs that can potentially serve as a relay between STA1 and the AP 110.

The target STA subsequently receives one or more R_Sel responses from one or more members of a set of candidate STAs based at least in part on the metrics (1020). As described above, the set of candidate STAs may include any STAs in the vicinity of the target STA that are able to receive the R_Sel request frame transmitted by the target STA. For some embodiments, only a subset of qualified candidate STAs may send R_Sel responses to the target STA. For example, a candidate STA may be qualified if, while acting as a relay: (1) there would be sufficient throughput gain in a first relay link between the AP 110 and the candidate STA (e.g., a throughput of the first relay link is greater than the throughput of the direct link by a threshold amount); (2) there would be sufficient throughput gain in a second relay link between the candidate STA and the target STA (e.g., a throughput of the second relay link is greater than the throughput of the direct link by a threshold amount); and (3) the candidate STA has sufficient battery life to sustain operations for at least a threshold duration.

Finally, the target STA selects a relay STA based on the received R_Sel response frames received from one or more candidate STAs in the set of candidate STAs (1030). For example, each R_Sel response frame may include information about a first relay link between the AP 110 and a corresponding qualified candidate STA as well as information about a second relay link between the corresponding qualified candidate STA and the target STA. For example, the information about the first relay link may include an RRSI value of the AP measured by the candidate STA, a highest achievable MCS at a threshold PER in the first relay link, a maximum goodput of the first relay link, and/or an estimated throughput of the first relay link. The information about the second relay link may include a channel and/or frequency of the second relay link and/or the estimated throughput of the second relay link. For some embodiments, STA1 may select a relay STA that maximizes throughput between the AP 110 and STA1. Additionally, selection of the relay STA may depend on the channel and/or frequency of the second relay link (e.g., the out-band link) associated with each of the qualified STAs.

Figure 11:
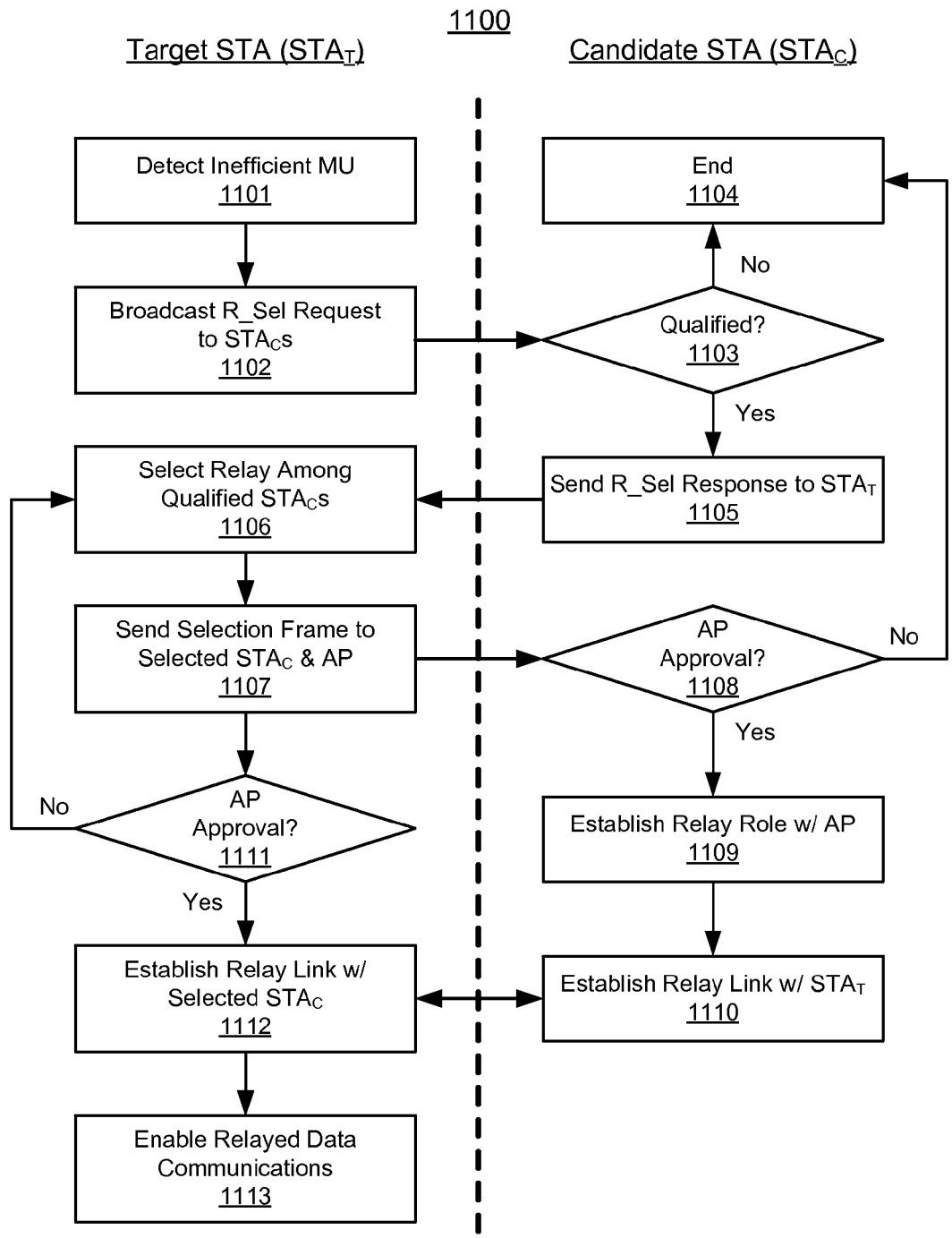
FIG. 11 shows an illustrative flow chart depicting a more detailed embodiment of the opportunistic relay selection operation of FIG. 10.

FIG. 11 shows an illustrative flow chart 1100 depicting a more detailed embodiment of the opportunistic relay selection operation of FIG. 10. For example, with reference to FIG. 1, one of the STAs in the WLAN 120 (e.g., STA1) may initiate the relay selection operation 1100 upon detecting a low MU efficiency (1101). As described above, a particular STA may have low MU efficiency if the highest achievable MCS at a threshold PER for that STA is below a threshold MCS. Alternatively, and/or in addition, a STA may have low MU efficiency if the goodput of a direct link between that STA and the AP 110, based on a given MCS, is below a threshold goodput.

A STA with low MU efficiency (e.g., a target STA) may broadcast an R_Sel request frame to a set of candidate STAs (1102). The set of candidate STAs (STA$_C$S) may include any STAs that are in the vicinity of the target STA and/or are able to receive the R_Sel request frame from the target STA. For some embodiments, the R_Sel request frame may contain information about the direct link between the AP 110 and the target STA. For example, the R_Sel request frame may include the highest achievable MCS at a threshold PER in the direct link, the maximum goodput of the direct link, the MU attributable to STA1, the RSSI value for AP 110 as measured by STA1, and/or the throughput of the direct link as measured by STA1. For some embodiments, the R_Sel request frame may also include information about the load per candidate out-band channel (e.g., to be used for a second relay link) as measured by the target STA.

Upon receiving the R_Sel request frame, each candidate STA determines whether it is qualified to act as a relay between the target STA and the AP 110 (1103). For some embodiments, each candidate STA may determine its qualifications based on the information included in the R_Sel request frame received from the target STA. For example, a candidate STA may be qualified if, while acting as a relay: (1) there would be sufficient throughput gain in a first relay link between the AP 110 and the candidate STA; (2) there would be sufficient throughput gain in a second relay link between the candidate STA and the target STA; and (3) the candidate STA has sufficient battery life to sustain operations for at least a threshold duration.

For some embodiments, a candidate STA may determine that there is sufficient throughput gain in the first relay link if the maximum goodput of the first relay link is at least M times greater than the maximum goodput of the direct link. Alternatively, and/or in addition, the candidate STA may determine that there is sufficient throughput gain in the first relay link if the highest achievable MCS at a threshold PER in the first relay link is at least M times greater than the highest achievable MCS at a threshold PER in the direct link. Still further, for some embodiments, the candidate STA may determine that there is sufficient throughput gain in the first relay link if the RSSI value of AP 110 measured by the candidate STA is at least a threshold amount greater than the RSSI value of AP 110 measured by the target STA.

For some embodiments, the candidate STA may determine that there is sufficient throughput gain in the second relay link if the estimated throughput of the second relay link is at least N times greater than the estimated throughput of the direct link. As described above, the second relay link may coincide with a different channel and/or frequency than the first relay link. Thus, in order to estimate the throughput of the second relay link, the candidate STA may consider the available MU for each candidate relay channel (e.g., for each out-band and/or in-band channel). More specifically, the estimated throughput of the second relay link may depend on the maximum available medium usage across all candidate relay channels.

A candidate STA may determine it is not qualified to act as a relay and thus may not respond to the R_Sel request frame if it determines that the throughput gain in either the first relay link or the second relay link is insufficient and/or the remaining charge on its battery is too low (1104). However, if the candidate STA determines that it is qualified to act as a relay between the AP 110 and the target STA (e.g., all of the aforementioned conditions are satisfied), it may then send an R_Sel response frame to the target STA (1105). For some embodiments, the R_Sel response frame may include information (e.g., one or more metrics) about a first relay link between the AP 110 and the candidate STA as well as information about a second relay link between the candidate STA and the target STA. For example, the information about the first relay link may include the RSSI value of AP 110 measured by the candidate STA, the highest achievable MCS at a threshold PER in the first relay link, the maximum goodput of the first relay link, and/or the estimated throughput of the first relay link. The information about the second relay link may include a channel and/or frequency for the second relay link and/or the estimated throughput of the second relay link.

The target STA selects one of the qualified candidate STAs to become the relay STA (1106), and sends a relay selection frame to the selected qualified candidate STA (1107). For some embodiments, the target STA may select the relay STA based at least in part on the information provided within the received R_Sel response frames. For example, STA1 may select the qualified candidate STA that maximizes throughput between the AP 110 and STA1. Alternatively, and/or in addition, STA1 may select a qualified candidate STA as the relay STA that would relay data to the target STA on an out-band channel furthest from, and/or least likely to interfere with, the in-band channel. For some embodiments, the relay selection frame may specify the channel and/or frequency (e.g., the out-band channel) to be used for the second relay link.

For some embodiments, the relay selection frame may be received by both the selected candidate STA (e.g., STA2, for the example of FIG. 11) and AP 110. For example, the AP 110 may determine whether the network load would be improved by relaying data through the selected relay STA to the target STA. More specifically, the AP 110 may authorize the relay selection if the relay configuration would improve and/or optimize the load on the WLAN 120. If the selected candidate STA does not receive a relay approval frame from the AP 110 (1108), it may subsequently terminate its portion of the relay selection operation 1100 (1104). For some embodiments, if the target STA does not receive a relay approval frame from the AP 110 (1111), it may select a new qualified candidate STA (1106). For other embodiments, the target STA may terminate the relay selection operation 1100 if it does not receive the relay approval frame from the AP 110 (1111).

Upon receiving a relay approval frame from the AP 110 (1108), the selected candidate STA may proceed by establishing a relay role with the AP 110 (1109), and setting up the second relay link with the target STA (1110). Similarly, the target STA may establish the second relay link with the selected candidate STA (1112) upon receiving the relay approval frame from the AP 110 (1111). For example, STA1 and STA2 may establish the second relay link between one another using known relay setup procedures (e.g., as defined by the IEEE 802.11 specification). For some embodiments, the relay approval frame may include association and authentication information to enable secure communications between the relay STA and the target STA. Once the second relay link is established, the target STA may enable relayed data communications with the AP 110 via the selected relay STA (1113). More specifically, STA1 (as the target STA) may send any data intended for the AP 110 to STA2 (as the relay STA), which then forwards that data to the AP 110. Similarly, the AP 110 may send any data intended for STA1 to STA2, which then forwards that data to STA1.

In the foregoing specification, the example embodiments have been described with reference to specific exemplary embodiments thereof. It will, however, be evident that various modifications and changes may be made thereto without departing from the broader scope of the disclosure as set forth in the appended claims. For example, the method steps depicted in the flow charts of FIGS. 6, 7, 10, and 11 may be performed in other suitable orders, multiple steps may be combined into a single step, and/or some steps may be omitted. The specification and drawings are, accordingly, to be regarded in an illustrative sense rather than a restrictive sense.

What is claimed is:

1. A method of operating an access point (AP) communicating with a plurality of stations (STAs) in a wireless network, the method comprising:
   identifying a target station (STA) of the plurality of STAs in the wireless network based at least in part on a medium usage efficiency of the target STA, wherein the medium usage efficiency of the target STA is based on a percentage of time the AP spends transmitting data to the target STA relative to a total time spent transmitting data to all of the plurality of STAs;

sending a relay selection trigger to the target STA to cause the target STA to broadcast a relay selection request to a set of candidate STAs in the wireless network, wherein the relay selection request includes a set of metrics pertaining to a direct link between the AP and the target STA;

receiving one or more relay selection responses from one or more candidate STAs in the set of candidate STAs based at least in part on the set of metrics; and selecting a relay STA from the one or more candidate STAs based at least in part on the one or more relay selection responses, wherein the selected relay STA is to relay data between the AP and the target STA.

2. The method of claim 1, wherein the target STA has the lowest medium usage efficiency among the plurality of STAs in the wireless network.

3. The method of claim 1, wherein the set of metrics comprises at least one member of a group consisting of: a modulation coding scheme (MCS) supported by the direct link, a goodput of the direct link, a medium usage by the target STA in the direct link, a throughput of the direct link, and a received signal strength indication (RSSI) value of the AP as measured by the target STA.

4. The method of claim 3, wherein the relay selection request causes each candidate STA in the set of candidate STAs to selectively transmit a respective one of the one or more relay selection responses based at least in part on whether the candidate STA is able to improve the throughput of the direct link by relaying data between the AP and the target STA.

5. The method of claim 4, wherein the relay selection request further causes each candidate STA to:
  estimate a throughput of a first relay link between the candidate STA and the AP;
  estimate a throughput of a second relay link between the candidate STA and the target STA; and
  transmit the respective relay selection response if the estimated throughput of the first relay link is greater than the throughput of the direct link by at least a first threshold gain and the estimated throughput of the second relay link is greater than the throughput of the direct link by at least a second threshold gain.

6. The method of claim 5, wherein a channel or frequency band of the second relay link is different than a channel or frequency band of the first relay link.

7. The method of claim 5, wherein the respective relay selection response includes the estimated throughput of the first relay link and the estimated throughput of the second relay link.

8. The method of claim 7, wherein the respective relay selection response further includes at least one member of a group consisting of: a channel or frequency of the second relay link, an MCS supported by the first relay link, a goodput of the first relay link, and an RSSI value of the AP as measured by the candidate STA.

9. The method of claim 7, wherein selecting the relay STA comprises:
  determining a combined throughput gain associated with each of the one or more relay selection responses based at least in part on the estimated throughput of the first relay link and the estimated throughput of the second relay link included within the corresponding relay selection response; and
  selecting the candidate STA associated with the highest combined throughput gain as the relay STA.

10. The method of claim 9, wherein the combined throughput gain is a ratio of the lowest of the estimated throughput of the first relay link or the estimated throughput of the second relay link relative to the throughput of the direct link.

11. An access point (AP), comprising:
  a memory storing instructions for enabling data to be relayed between the AP and a plurality of station (STA) in a wireless network;
  one or more processors that, upon executing the instructions, cause the AP to:
    identify a target STA based at least in part on a medium usage efficiency of the target STA, wherein the medium usage efficiency of the target STA is based on a percentage of time the AP spends transmitting data to the target STA relative to a total time spent transmitting data to all of the plurality of STAs;
    send a relay selection trigger to the target STA to cause the target STA to broadcast a relay selection request to a set of candidate STAs, wherein the relay selection request includes a set of metrics pertaining to a direct link between the AP and the target STA;
    receive one or more relay selection responses from one or more candidate STAs in the set of candidate STAs based at least in part on the set of metrics; and
    select a relay STA from the one or more candidate STAs based at least in part on the one or more relay selection responses, wherein the selected relay STA is to relay data between the AP and the target STA based at least in part on the one or more relay selection responses.

12. The AP of claim 11, wherein the target STA has the lowest medium usage efficiency among a plurality of STAs in the wireless network.

13. The AP of claim 11, wherein the set of metrics comprises at least one member of a group consisting of: a modulation coding scheme (MCS) supported by the direct link, a goodput of the direct link, a medium usage by the target STA in the direct link, a throughput of the direct link, and a received signal strength indication (RSSI) value of the AP as measured by the target STA.

14. The AP of claim 13, wherein the relay selection request causes each candidate STA in the set of candidate STAs to selectively transmit a respective one of the one or more relay selection responses based at least in part on whether the candidate STA is able to improve the throughput of the direct link by relaying data between the AP and the target STA.

15. The AP of claim 14, wherein the relay selection request further causes each candidate STA to:
  estimate a throughput of a first relay link between the candidate STA and the AP;
  estimate a throughput of a second relay link between the candidate STA and the target STA; and
  transmit the respective relay selection response if the estimated throughput of the first relay link is greater than the throughput of the direct link by at least a first threshold and the estimated throughput of the second relay link is greater than the throughput of the direct link by at least a second threshold.

16. The AP of claim 15, wherein a channel or frequency band of the second relay link is different than a channel or frequency band of the first relay link.

17. The AP of claim 15, wherein the respective relay selection response includes the estimated throughput of the first relay link and the estimated throughput of the second relay link.

18. The AP of claim 17, wherein the respective relay selection response further includes at least one member of a group consisting of: a channel or frequency of the second relay link, an MCS supported by the first relay link, a goodput of the first relay link, and an RSSI value of the AP as measured by the candidate STA.

19. The AP of claim 17, wherein execution of the instructions to select the relay STA causes the AP to:
determine a combined throughput gain associated with each of the one or more relay selection responses based at least in part on the estimated throughput of the first relay link and the estimated throughput of the second relay link included within the corresponding relay selection response; and
select the candidate STA associated with the highest combined throughput gain as the relay STA.

20. The AP of claim 19, wherein the combined throughput gain is a ratio of the lowest of the estimated throughput of the first relay link or the estimated throughput of the second relay link relative to the throughput of the direct link.

21. An access point (AP), comprising:
means for identifying a target station (STA) in a wireless network based at least in part on a medium usage efficiency of the target STA, wherein the medium usage efficiency of the target STA is based on a percentage of time the AP spends transmitting data to the target STA relative to a total time spend transmitting data to all of a plurality of STAs;
means for sending a relay selection trigger to the target STA to cause the target STA to broadcast a relay selection request to a set of candidate STAs in the wireless network, wherein the relay selection request includes a set of metrics pertaining to a direct link between the AP and the target STA;
means for receiving one or more relay selection responses from one or more candidate STAs in the set of candidate STAs based at least in part on the set of metrics; and
means for selecting a relay STA from the one or more candidate STAs based at least in part on the one or more relay selection responses, wherein the selected relay STA is to relay data between the AP and the target STA.

22. The AP of claim 21, wherein the target STA has the lowest medium usage efficiency among the plurality of STAs in the wireless network.

23. The AP of claim 21, wherein the set of metrics comprises at least one member of a group consisting of: a modulation coding scheme (MCS) supported by the direct link, a goodput of the direct link, a medium usage by the target STA in the direct link, a throughput of the direct link, and a received signal strength indication (RSSI) value of the AP as measured by the target STA.

24. The AP of claim 23, wherein the relay selection request causes each candidate STA in the set of candidate STAs to selectively transmit a respective one of the one or more relay selection responses based at least in part on whether the candidate STA is able to improve the throughput of the direct link by relaying data between the AP and the target STA.

25. The AP of claim 24, wherein the relay selection request further causes each candidate STA to:

estimate a throughput of a first relay link between the candidate STA and the AP;
estimate a throughput of a second relay link between the candidate STA and the AP; and
transmit the respective relay selection response if the estimated throughput of the first relay link is greater than the throughput of the direct link by at least a first threshold gain and the estimated throughput of the second relay link is greater than the throughput of the direct link by at least a second threshold gain.

26. The AP of claim 25, wherein a channel or frequency band of the second relay link is different than a channel or frequency band of the first relay link.

27. The AP of claim 25, wherein the respective relay selection response includes the estimated throughput of the first relay link and the estimated throughput of the second relay link.

28. The AP of claim 27, wherein the respective relay selection response further includes at least one member of a group consisting of: a channel or frequency of the second relay link, an MCS supported by the first relay link, a goodput of the first relay link, and an RSSI value of the AP as measured by the candidate STA.

29. The AP of claim 28, wherein the means for selecting the relay STA is to:
determine a combined throughput gain associated with each of the one or more relay selection responses based at least in part on the estimated throughput of the first relay link and the estimated throughput of the second relay link included within the corresponding relay selection response; and
select the candidate STA associated with the highest combined throughput gain as the relay STA.

30. A non-transitory computer-readable storage medium containing program instructions that, when executed by a processor of an access point (AP), causes the AP to:
identify a target station (STA) in a wireless network based at least in part on a medium usage efficiency of the target STA, wherein the medium usage efficiency of the target STA is based on a percentage of time the AP spends transmitting data to the target STA relative to a total time spend transmitting data to all of a plurality of STAs;
send a relay selection trigger to the target STA to cause the target STA to broadcast a relay selection request to a set of candidate STAs in the wireless network, wherein the relay selection request includes a set of metrics pertaining to a direct link between the AP and the target STA;
receive one or more relay selection responses from one or more candidate STAs in the set of candidate STAs based at least in part on the set of metrics; and
select a relay STA from the one or more candidate STAs based at least in part on the one or more relay selection responses, wherein the selected relay STA is to relay data between the AP and the target STA.

* * * * *